(12) United States Patent
Klipfel, III

(10) Patent No.: US 8,417,488 B2
(45) Date of Patent: *Apr. 9, 2013

(54) COMPUTER CODE AND METHOD FOR DESIGNING A MULTI-FAMILY DWELLING

(76) Inventor: Arthur A. Klipfel, III, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/446,262

(22) Filed: Apr. 13, 2012

(65) Prior Publication Data

US 2012/0197603 A1  Aug. 2, 2012

Related U.S. Application Data

(63) Continuation of application No. 12/114,526, filed on May 2, 2008, now Pat. No. 8,160, 842.

(60) Provisional application No. 60/927,768, filed on May 4, 2007.

(51) Int. Cl.
*G06F 17/50* (2006.01)

(52) U.S. Cl. ............................................. 703/1

(58) Field of Classification Search ........................ 703/1
See application file for complete search history.

(56) References Cited

U.S. PATENT DOCUMENTS

| | | | |
|---|---|---|---|
| 6,393,774 B1 | 5/2002 | Fisher | 52/79.1 |
| 6,651,393 B2 | 11/2003 | Don et al. | 52/79.5 |
| 6,826,879 B1 | 12/2004 | Allen et al. | 52/236.3 |
| 7,036,281 B2 | 5/2006 | Stewart et al. | 52/236.3 |
| 7,246,044 B2 | 7/2007 | Imamura et al. | 703/1 |
| 7,395,191 B2 | 7/2008 | Detwiler et al. | 703/1 |
| 7,529,650 B2 | 5/2009 | Wakelam et al. | 703/1 |
| 7,779,586 B2 | 8/2010 | Stewart et al. | 52/236.3 |
| 2004/0074173 A1 | 4/2004 | Miller | 52/234 |
| 2006/0265196 A1* | 11/2006 | Stone, Jr. | 703/1 |

FOREIGN PATENT DOCUMENTS

| | | |
|---|---|---|
| JP | 2002061400 | 2/2002 |
| JP | 2002245114 | 8/2002 |
| JP | 2003173363 | 6/2003 |

OTHER PUBLICATIONS

International Searching Authority, Written Opinion of the International Searching Authority, PCT/US2008/062485, dated Sep. 29, 2008, 5 pages.

* cited by examiner

*Primary Examiner* — Eunhee Kim
(74) *Attorney, Agent, or Firm* — Sunstein Kann Murphy & Timbers LLP

(57) ABSTRACT

A collection of dwelling unit module designs is created from which multi-family dwelling buildings or the multi-family portion of a mixed-use building may be designed. The module designs each fit onto uniform grid intervals defining a structural support system which may fit a parking layout below the units. A module design may include an individual unit or a stack of units. A graphical user interface to a computer system accommodates defining a site specific outline for the building and filling the outline with dwelling unit modules from the collection. The dwelling unit module designs may be designed and perfected in a manner independent of and in advance of any specific project and project schedule.

25 Claims, 46 Drawing Sheets

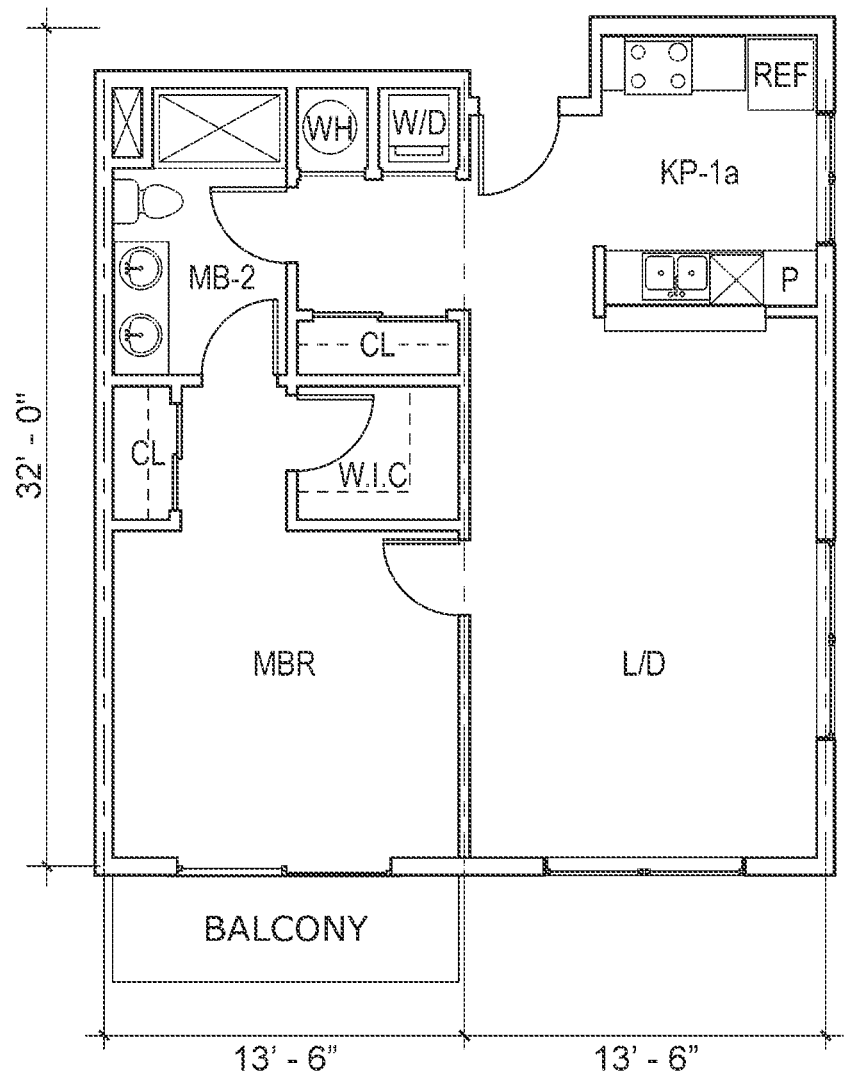
FIG. 1-A

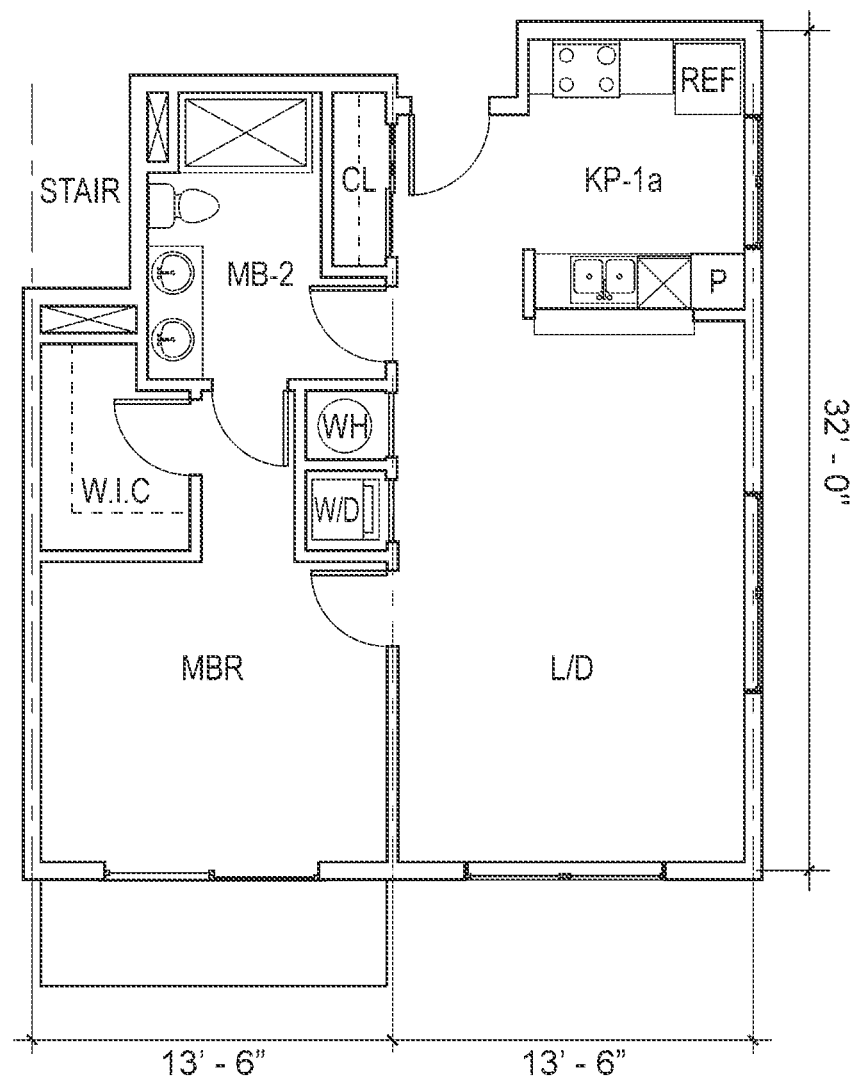
FIG. 1-B

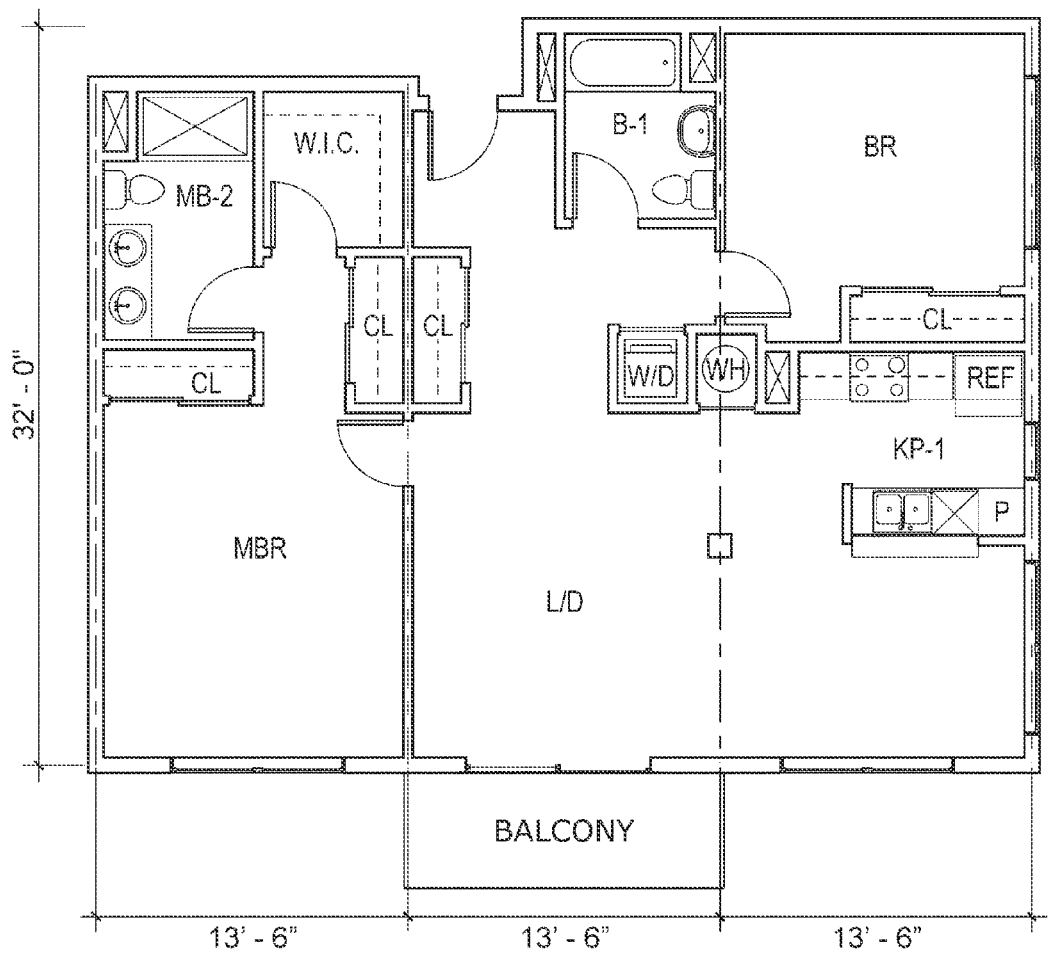
FIG. 1-C

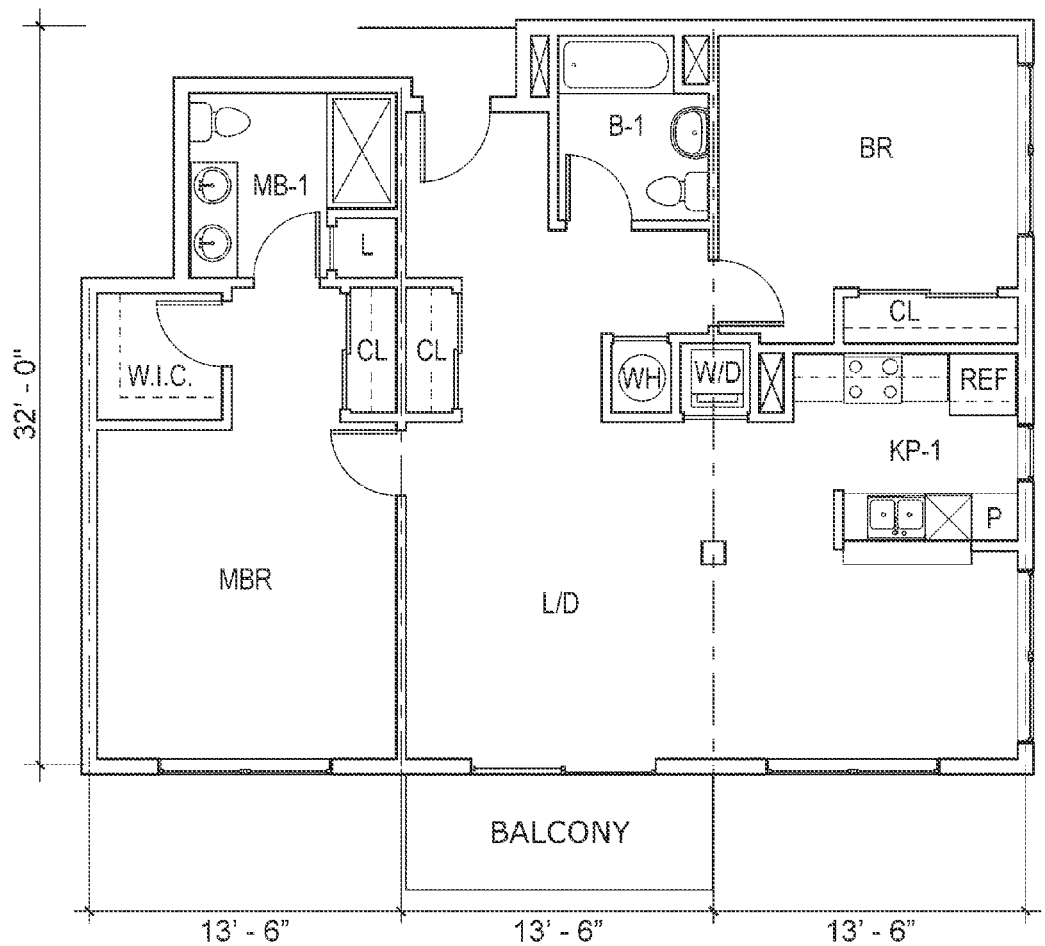
FIG. 1-D

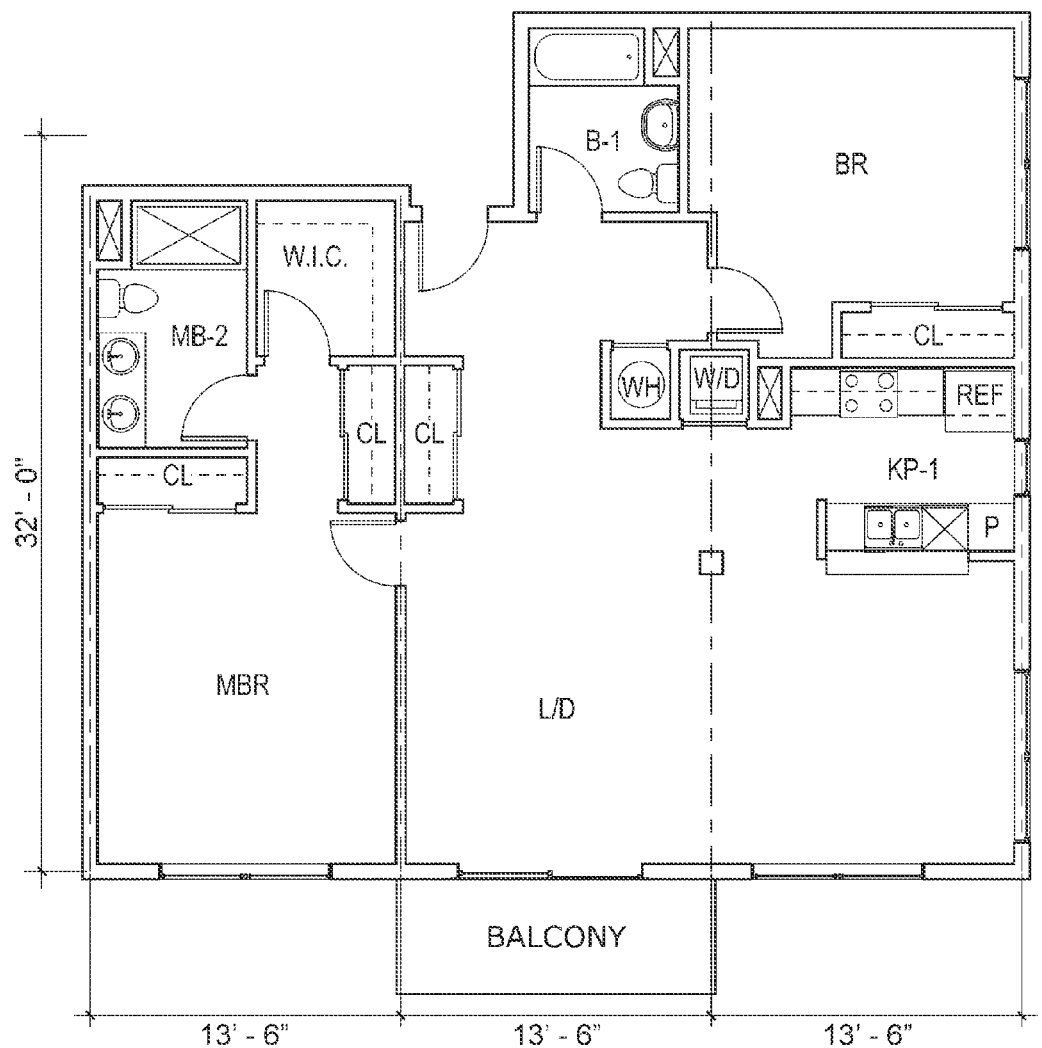
FIG. 1-E

FIG. 1-F

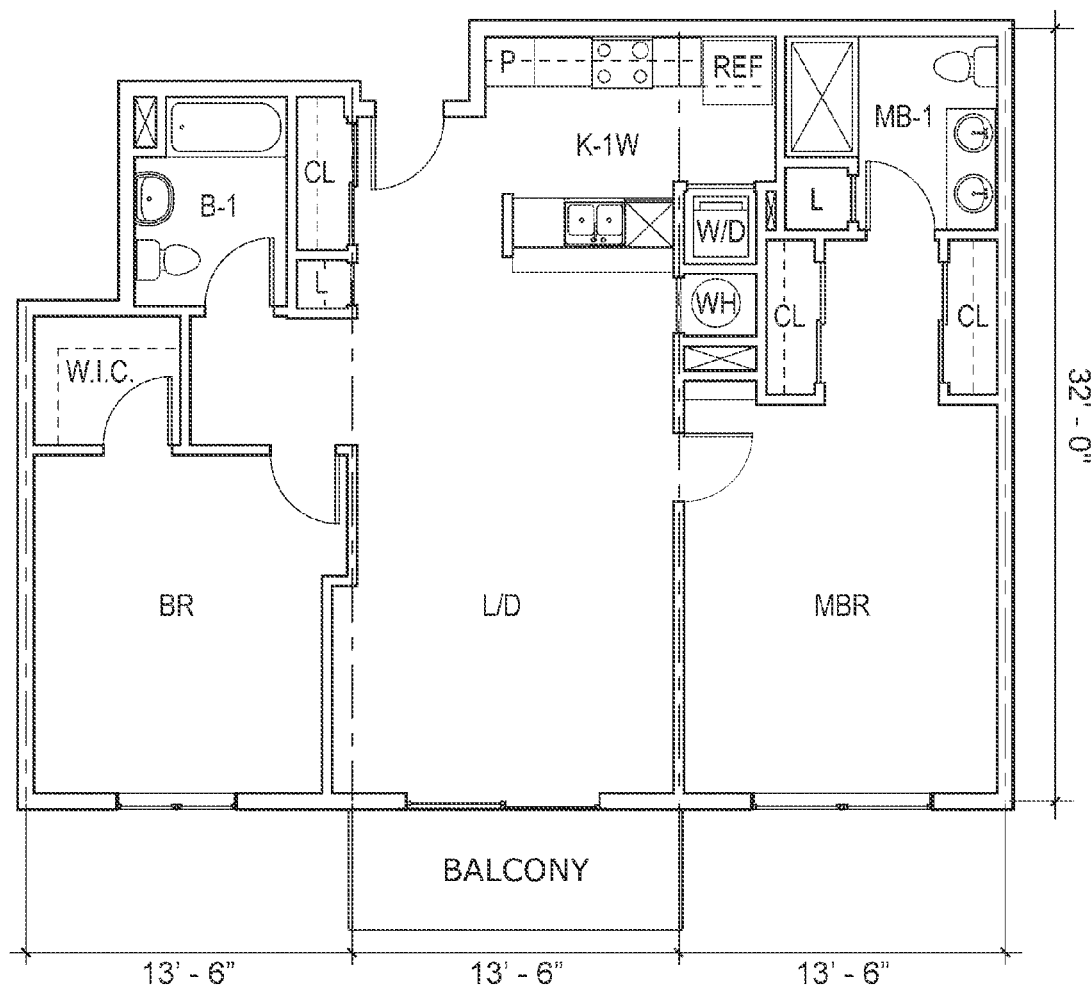
FIG. 1-G

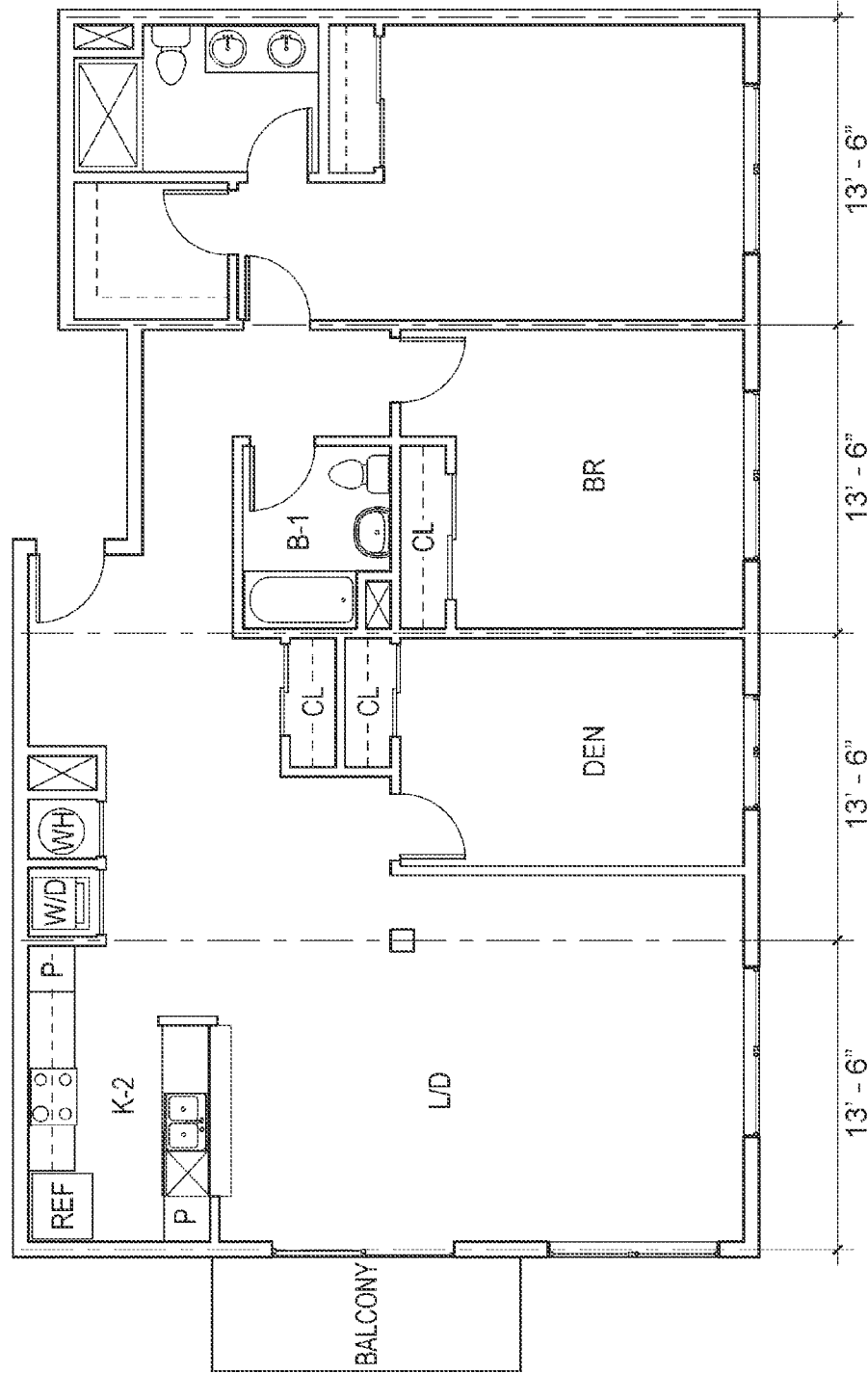

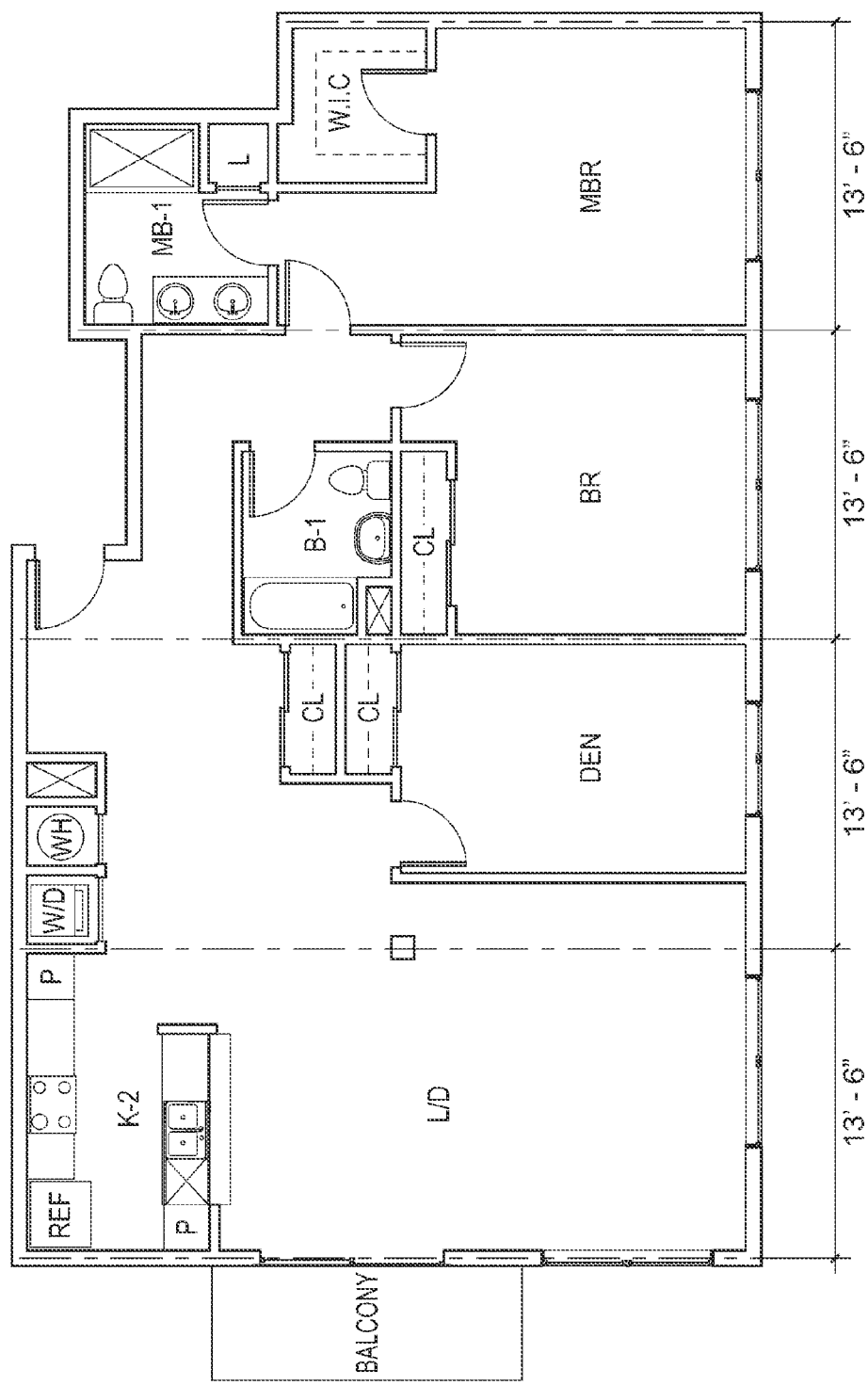
FIG. 1-I

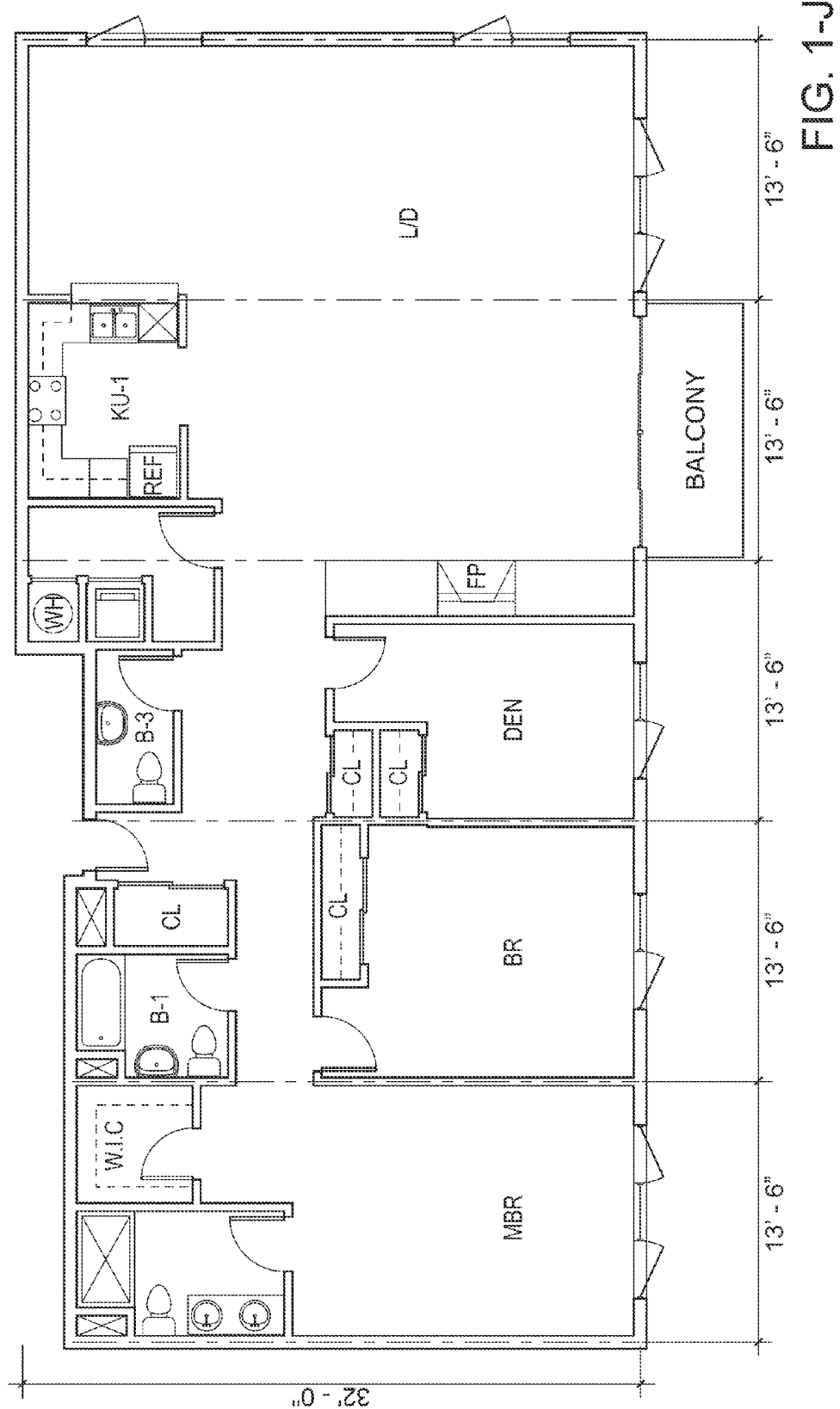
FIG. 1-J

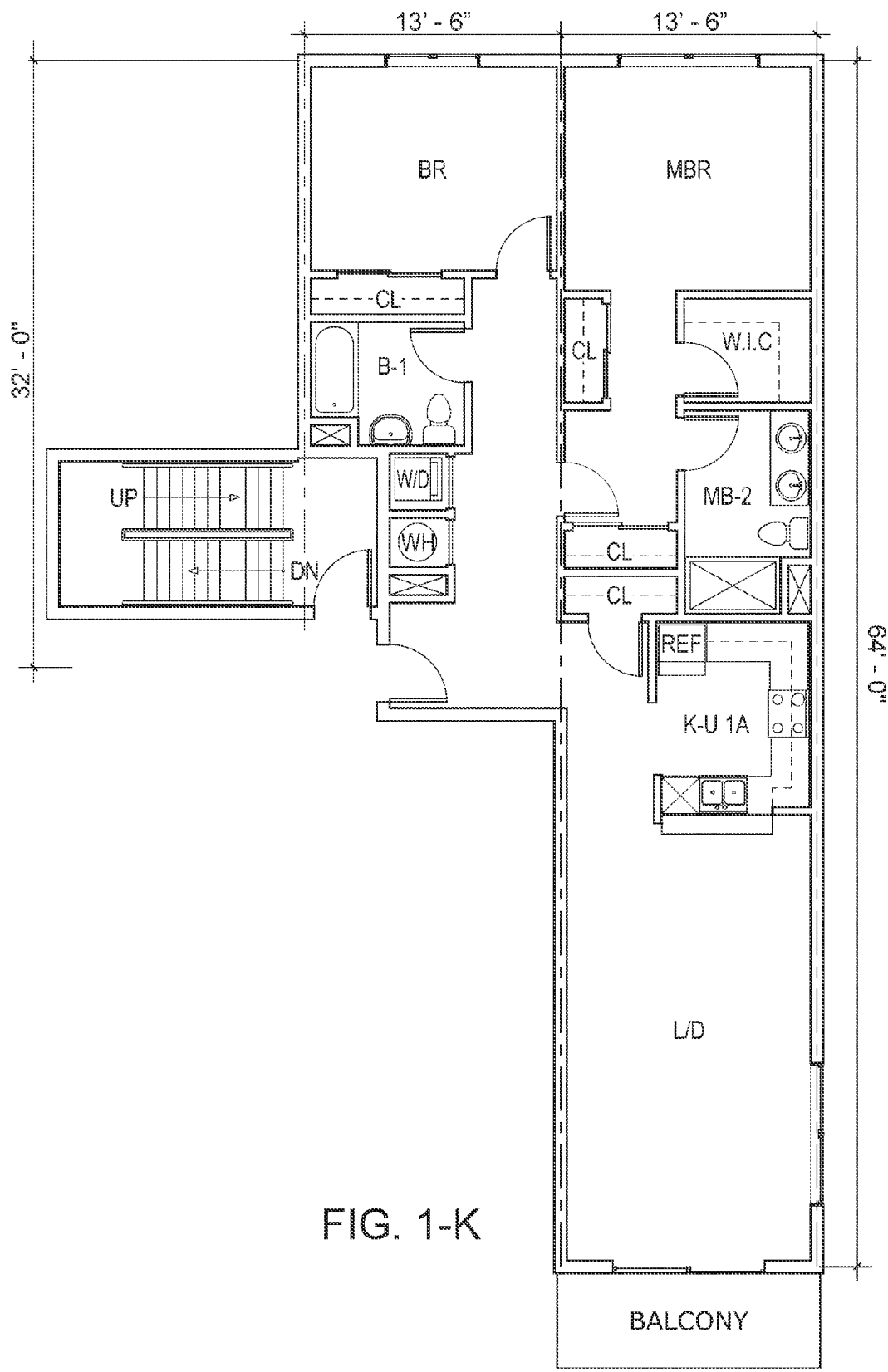
FIG. 1-K

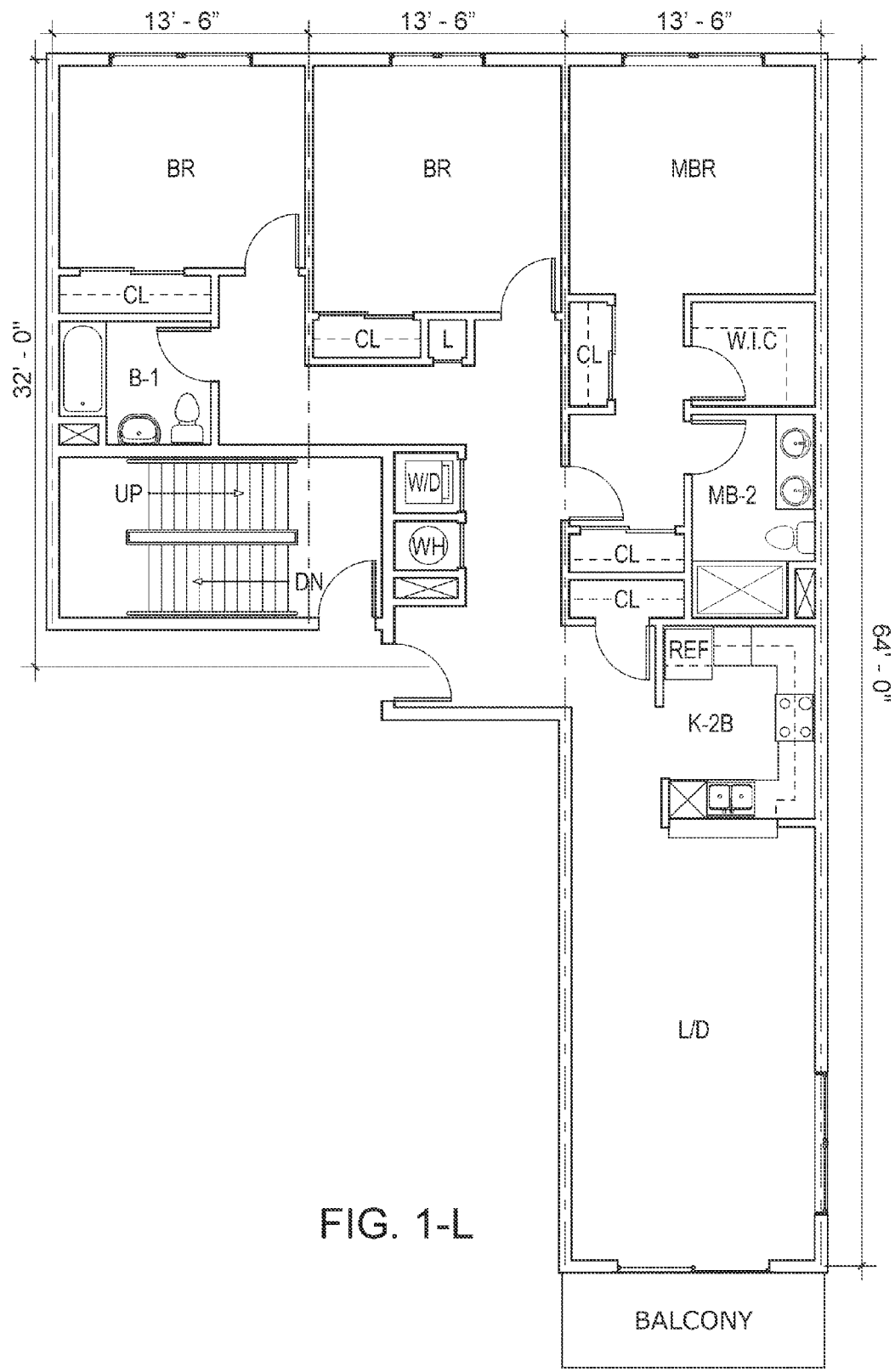
FIG. 1-L

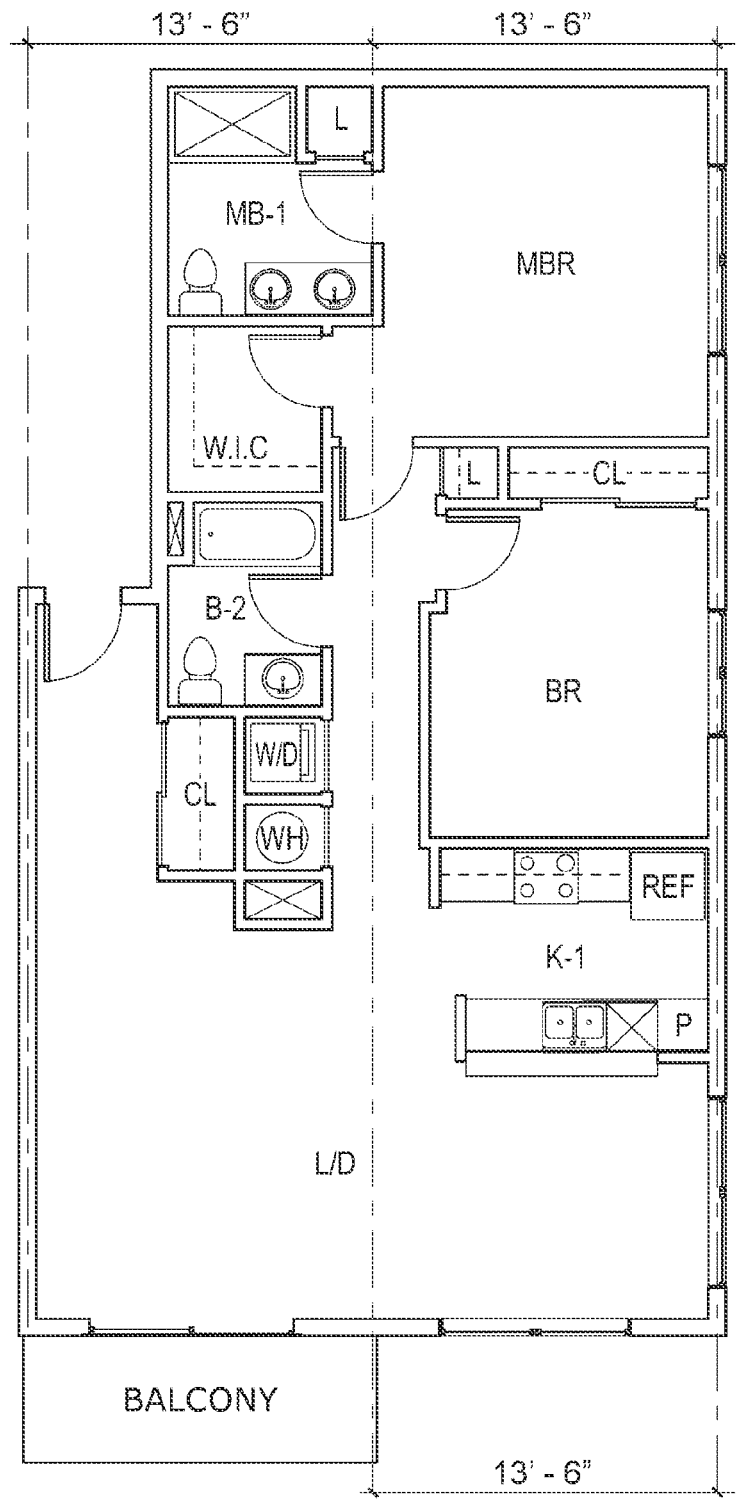
FIG. 1-M

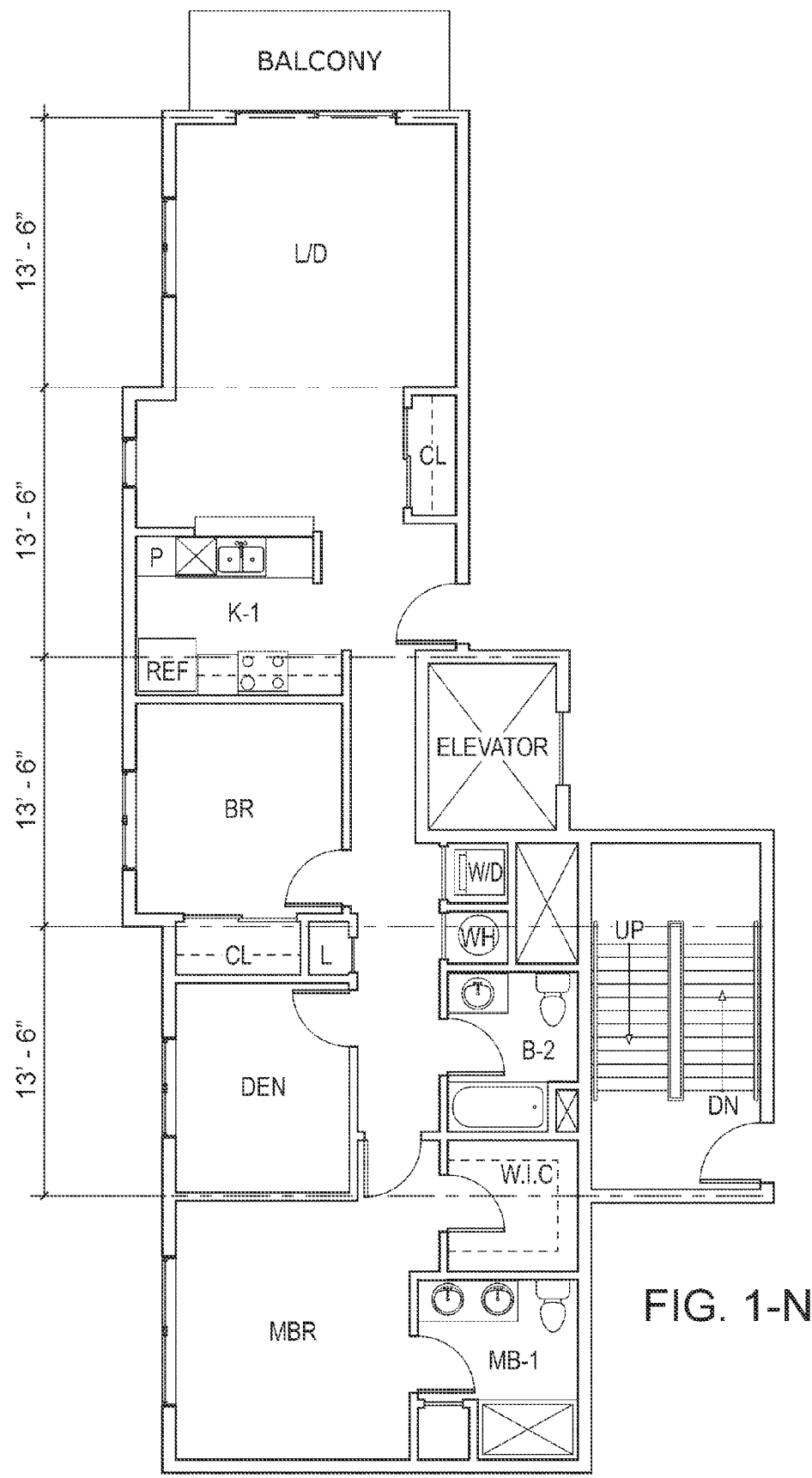
FIG. 1-N

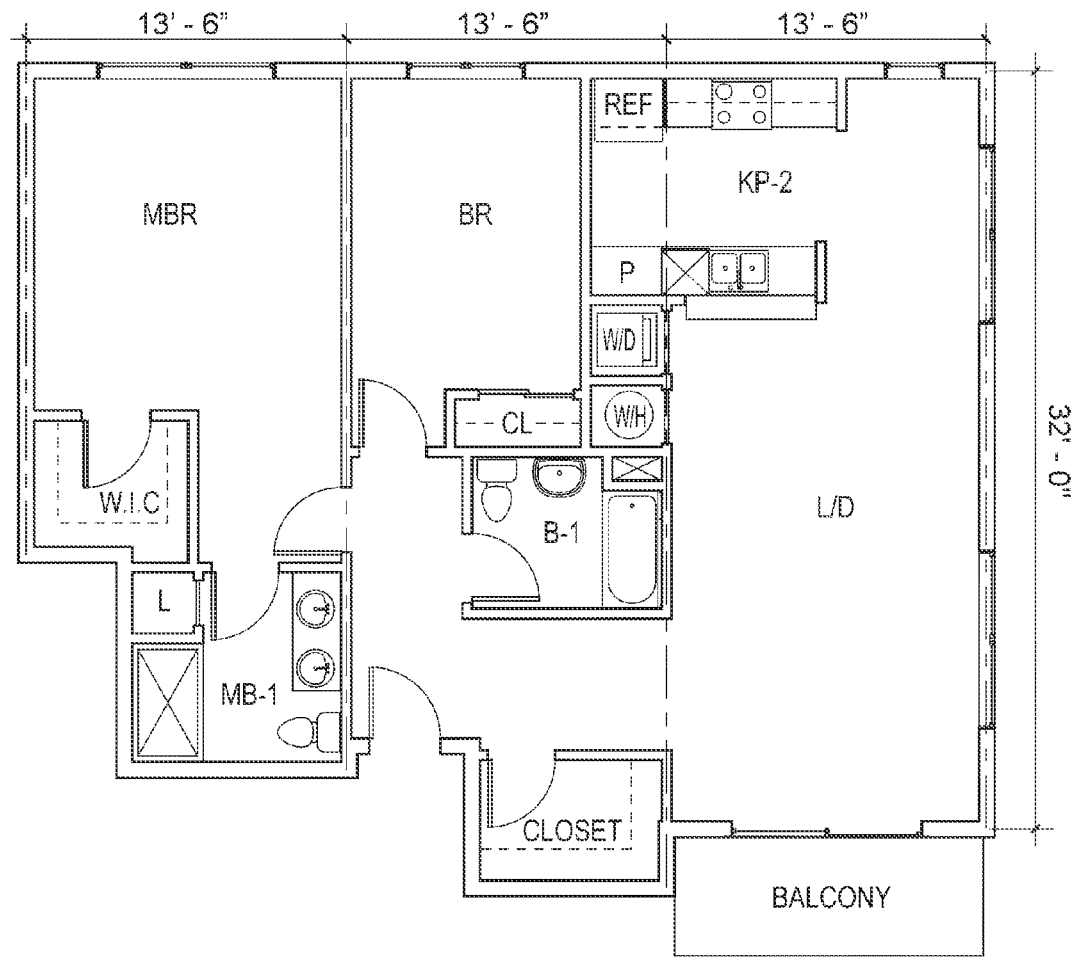
FIG. 1-O

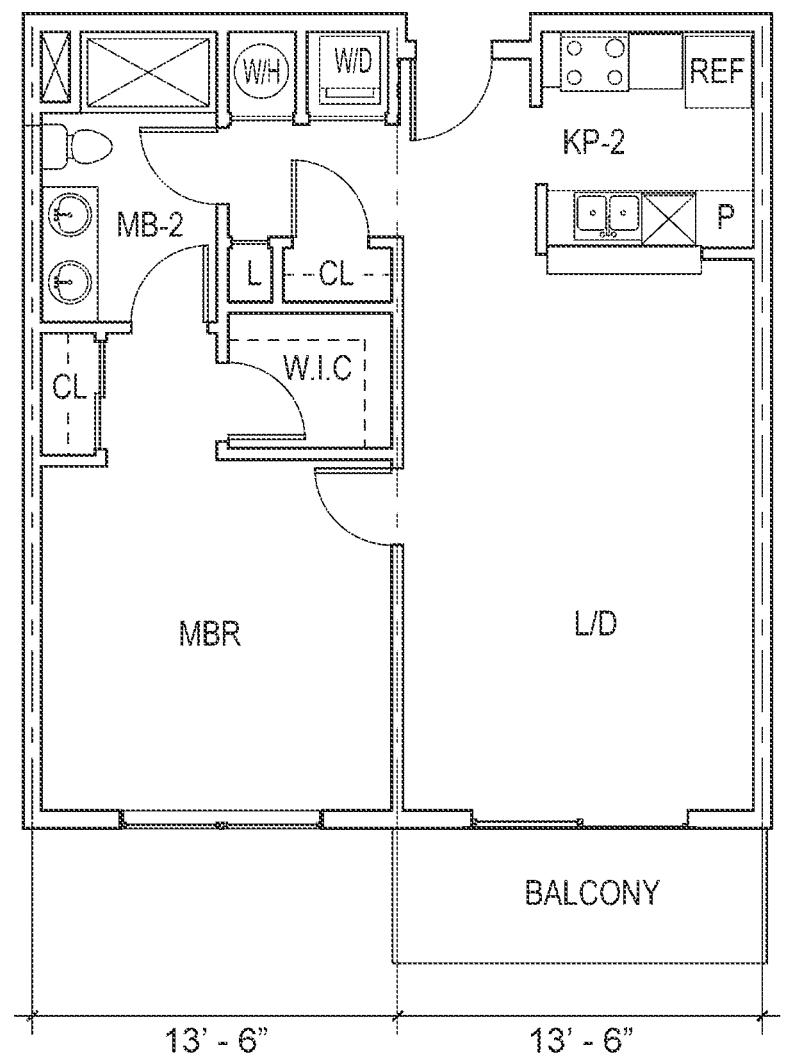
FIG. 1-P

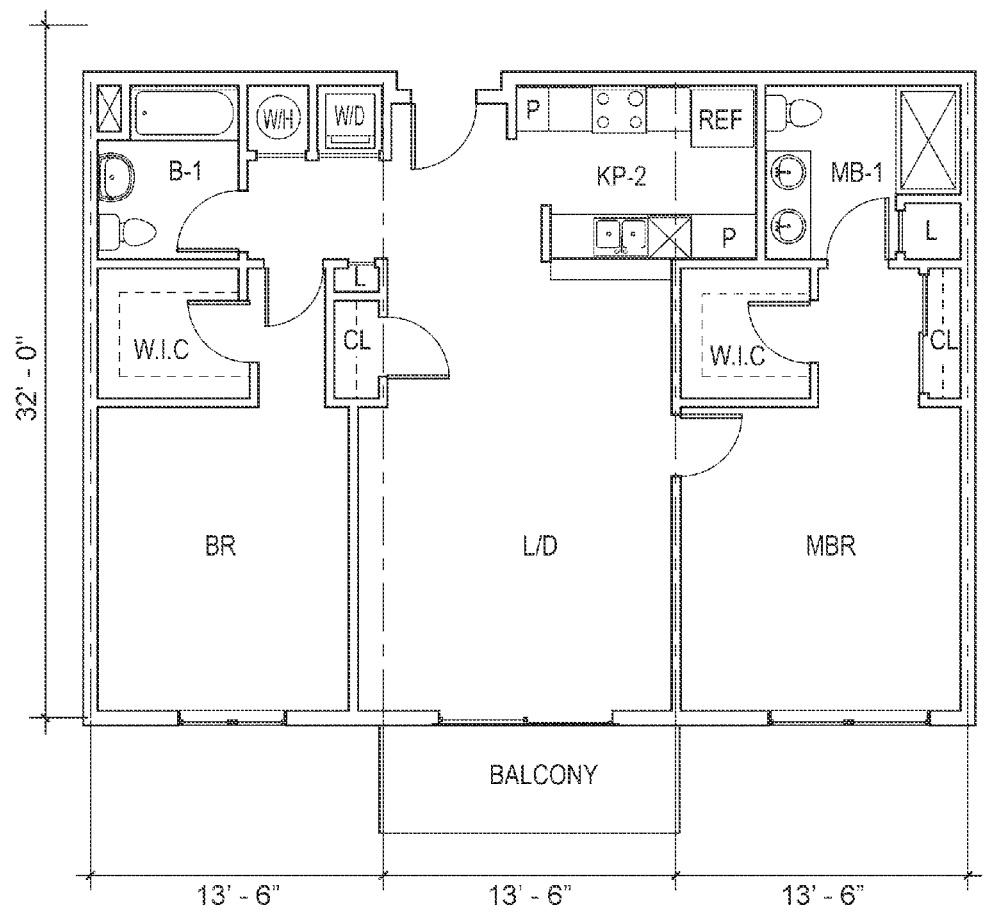
FIG. 1-Q

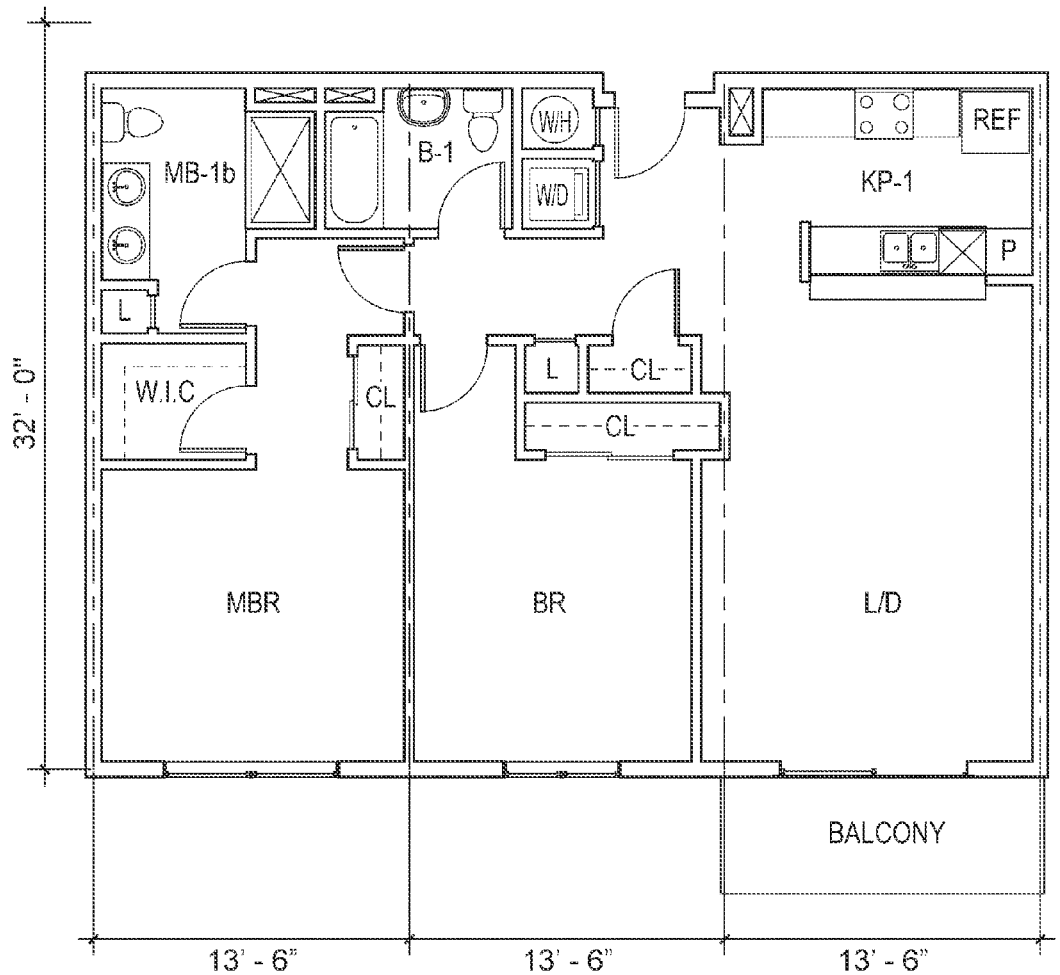
FIG. 1-R

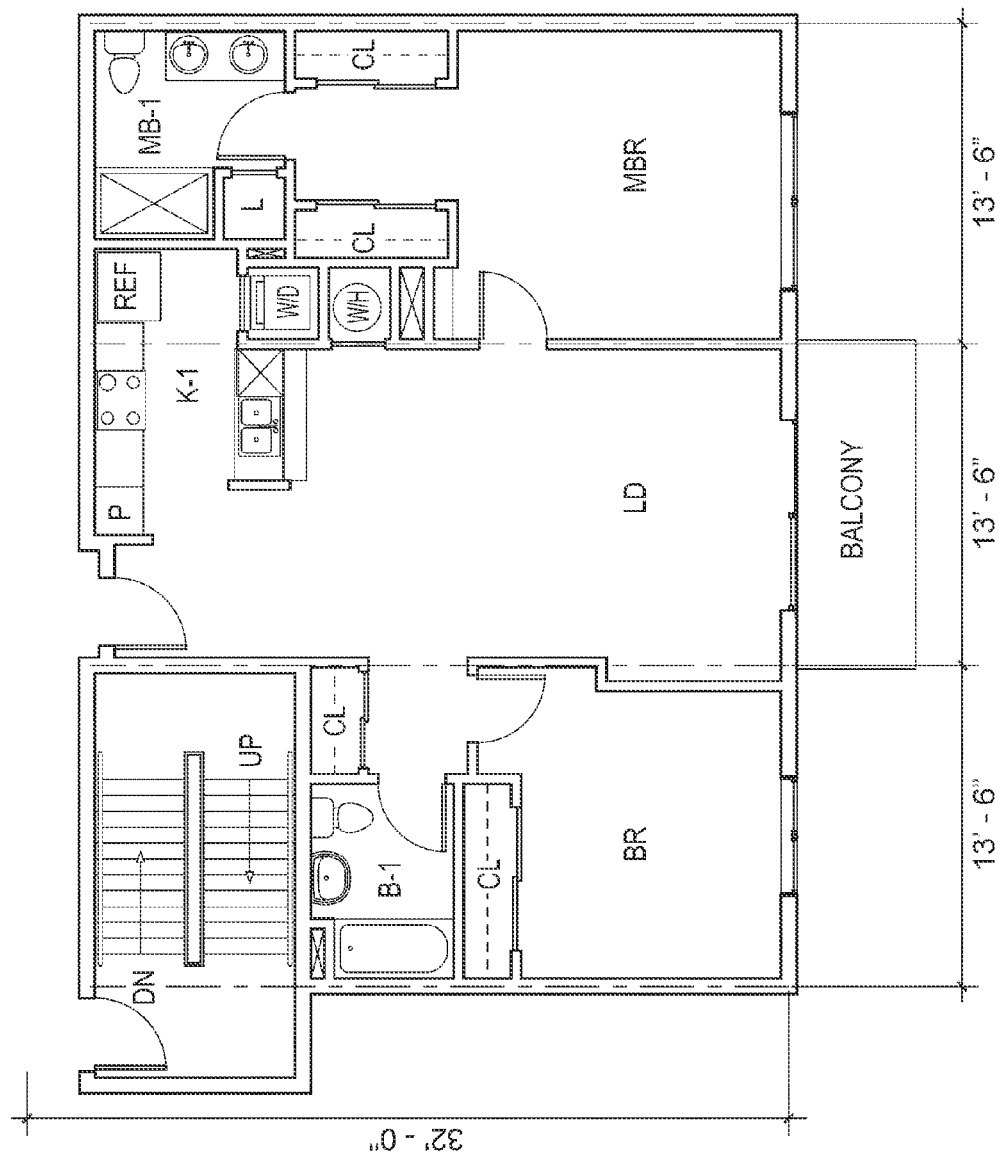
FIG. 1-S

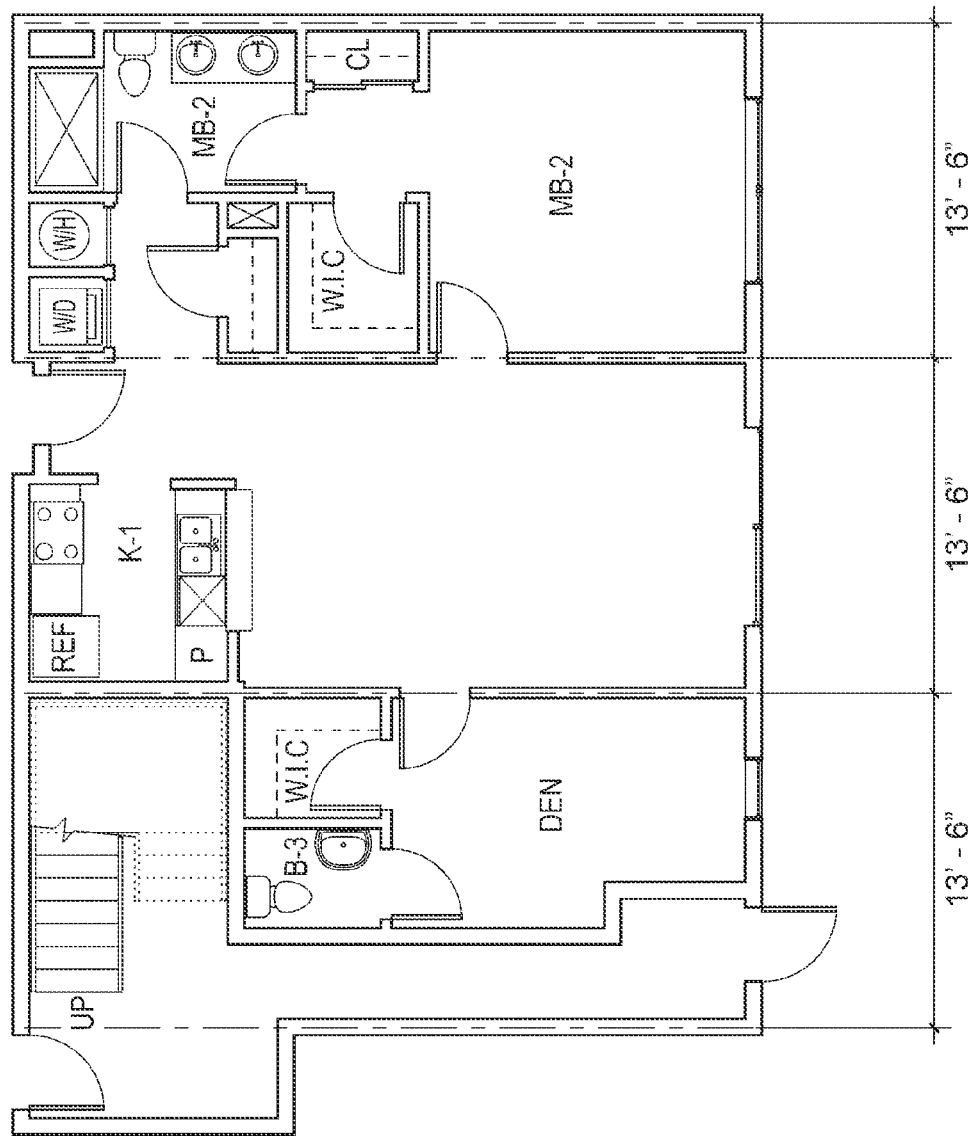
FIG. 1-T

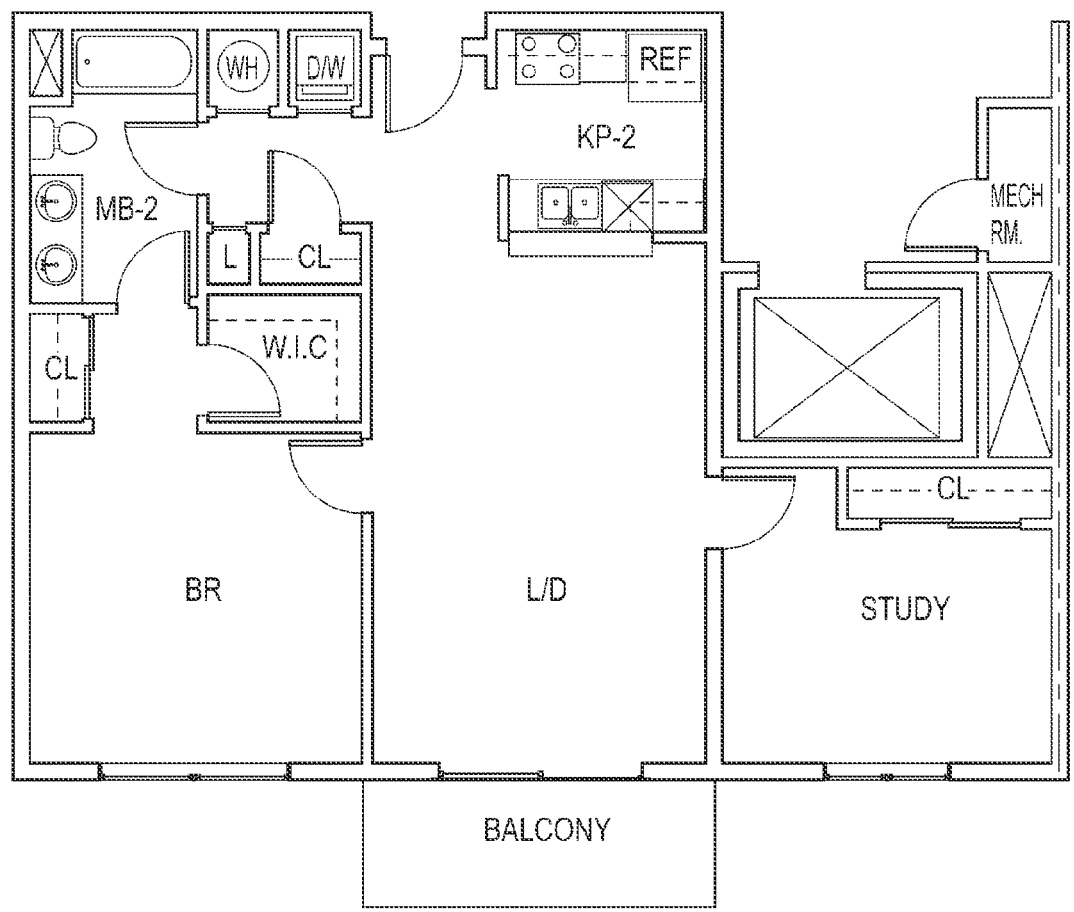
FIG. 1-U

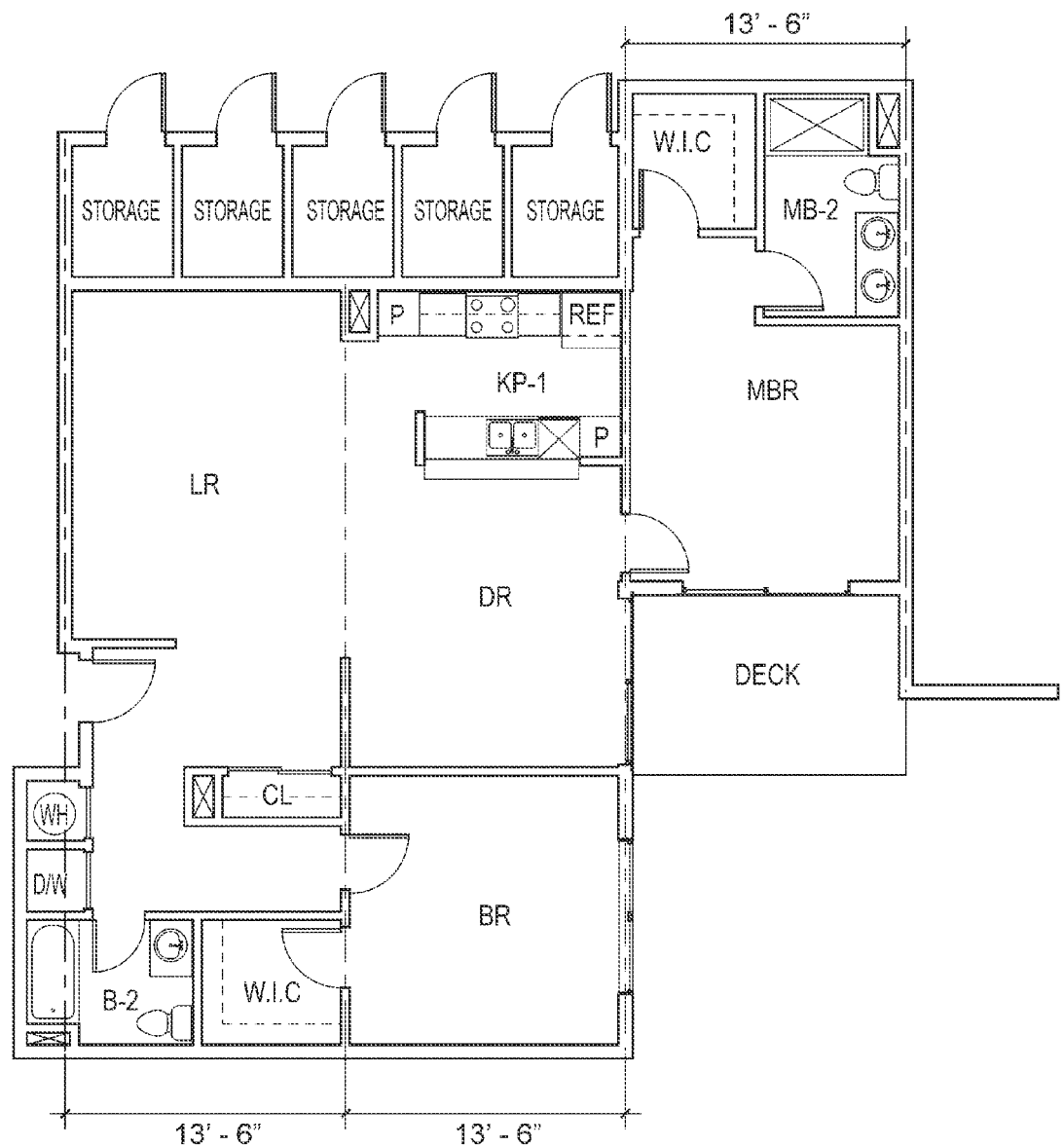
FIG. 1-V

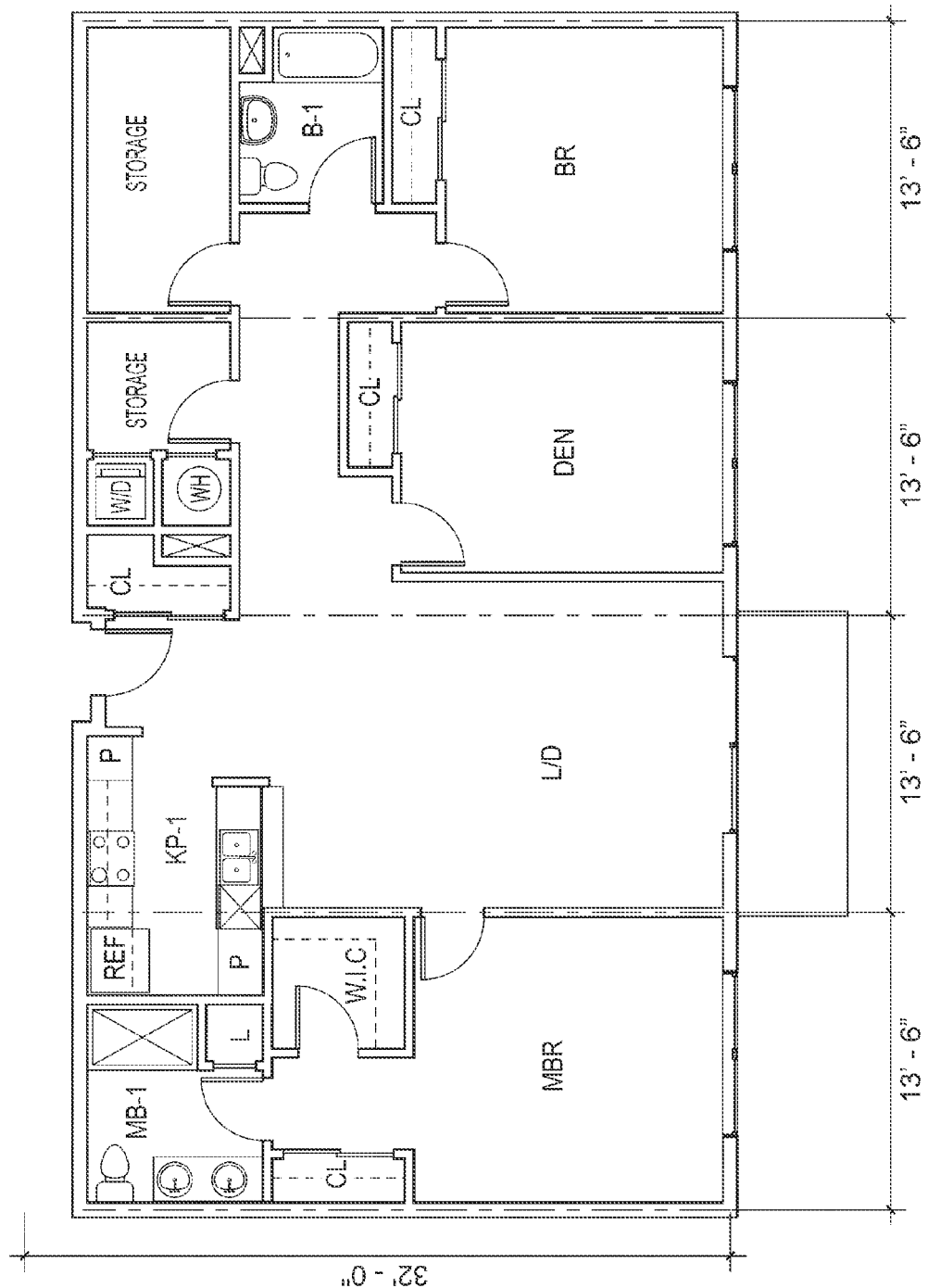

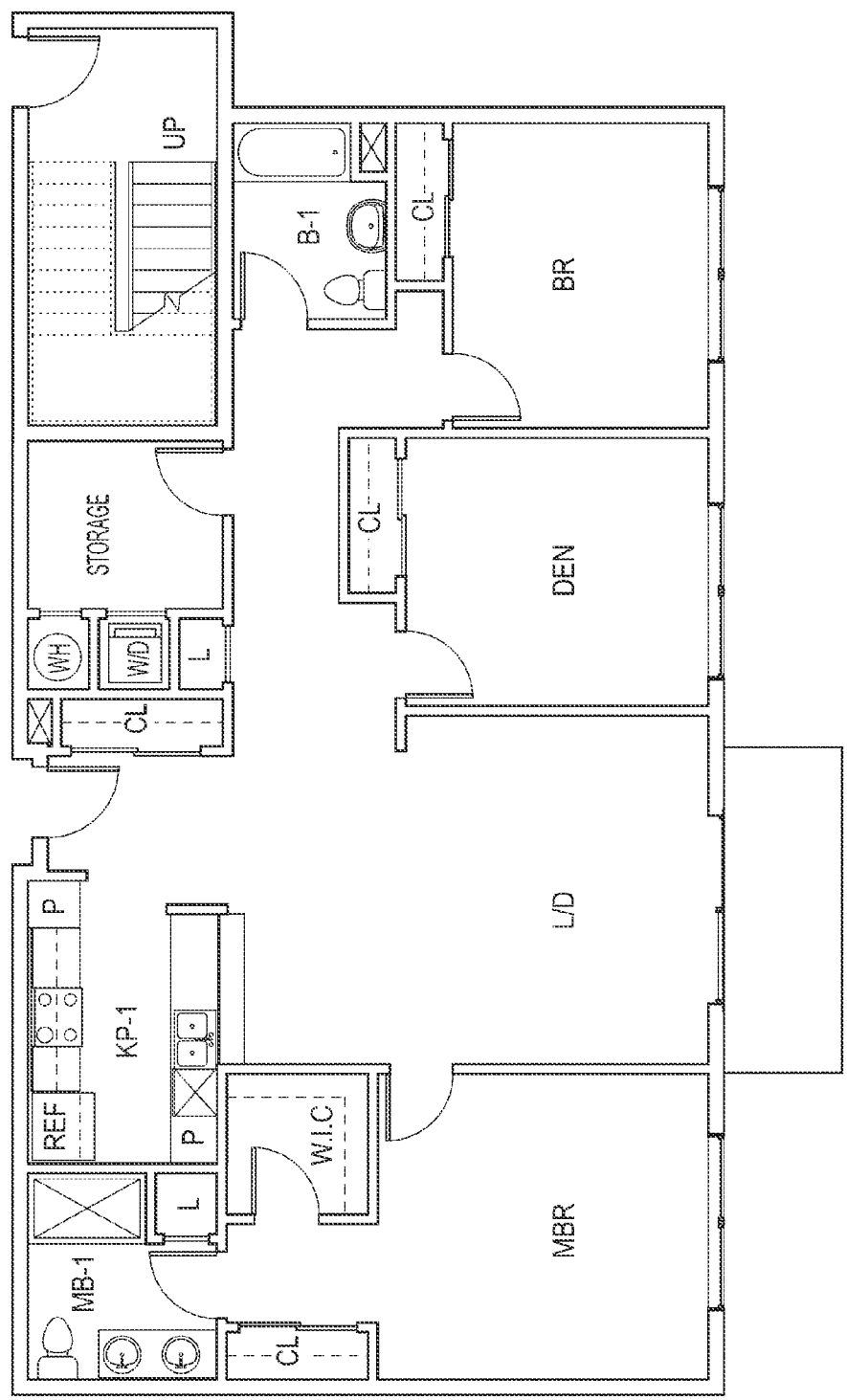
FIG. 1-X

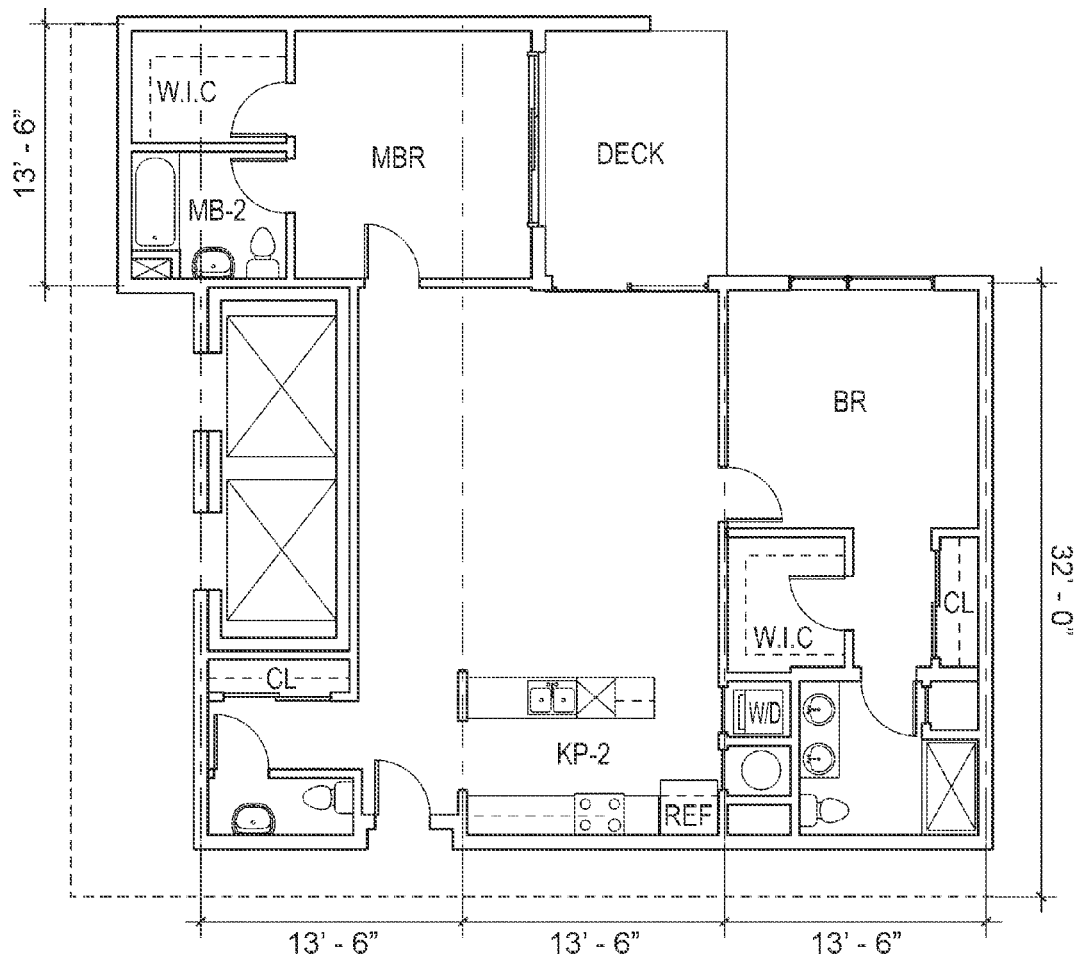
FIG. 1-Y

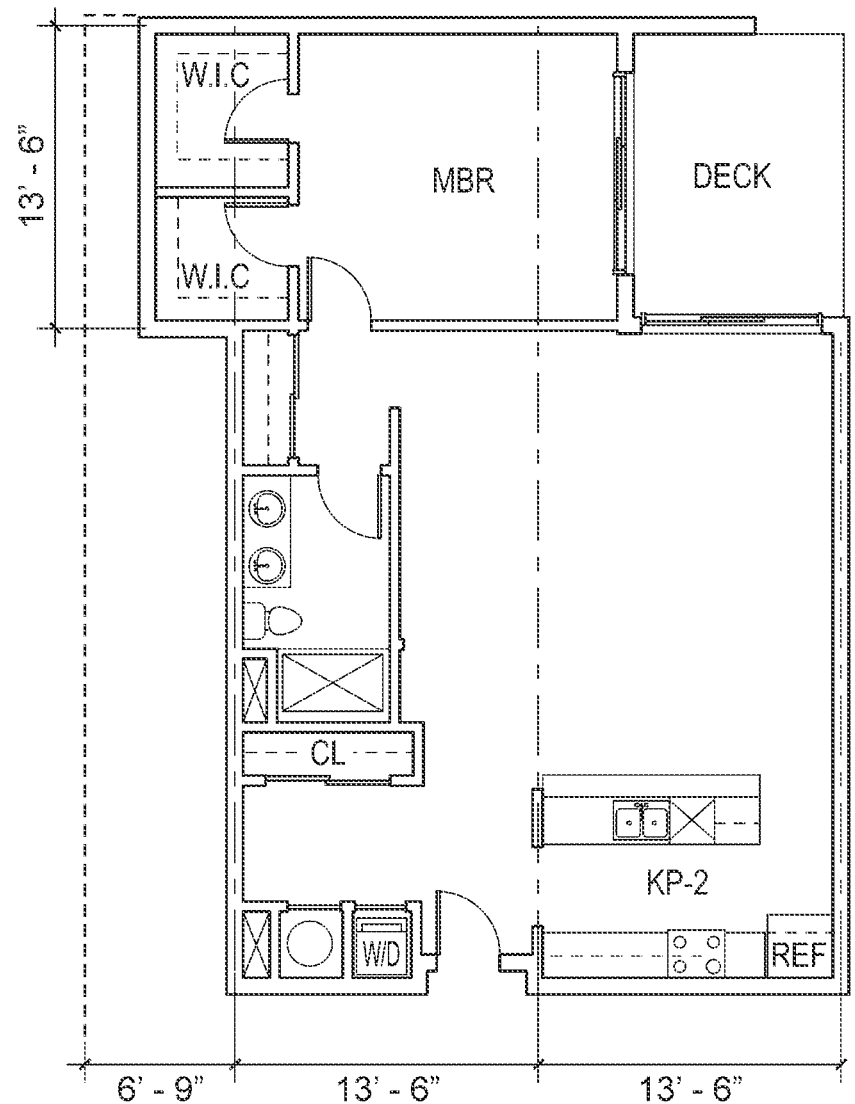
FIG. 1-Z

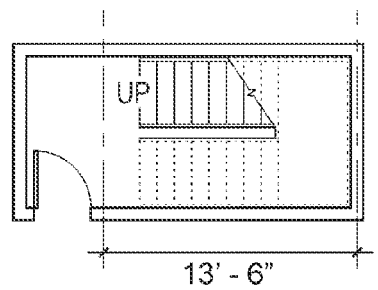
FIG. 2-A
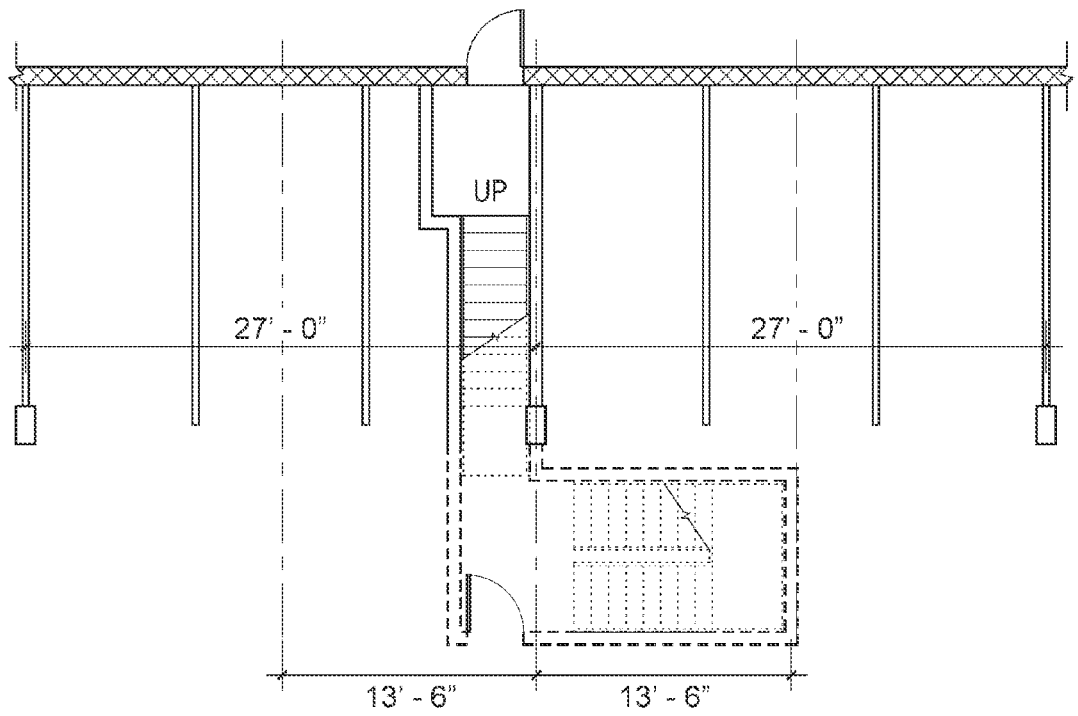
FIG. 2-B

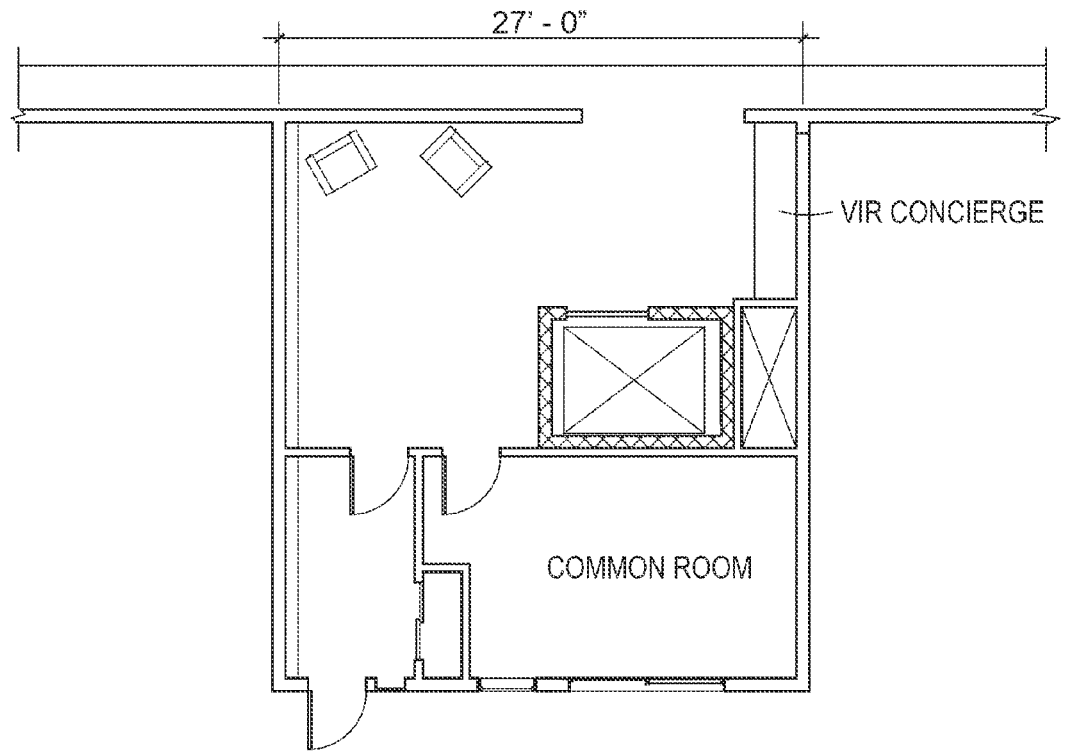
FIG. 2-C
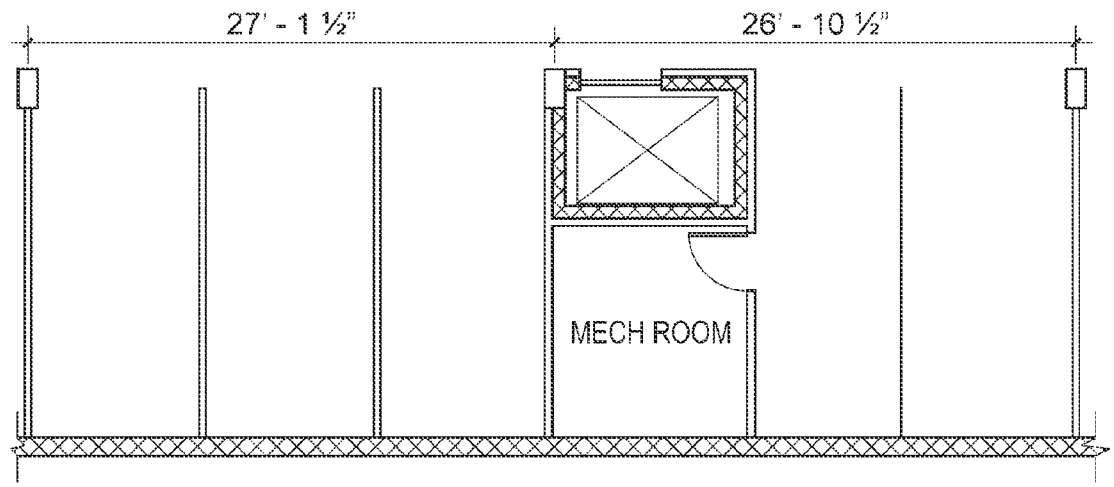
FIG. 2-D

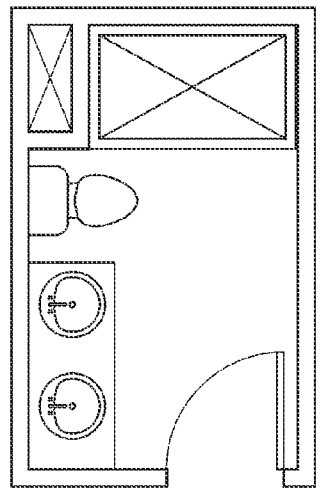
FIG. 3-A
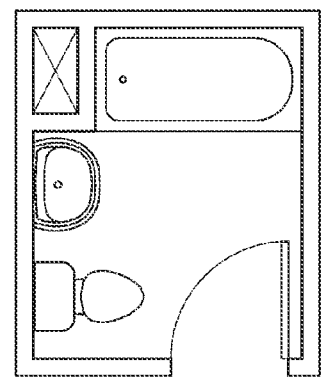
FIG. 3-B
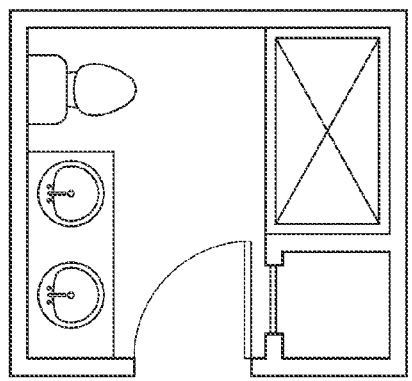
FIG. 3-C
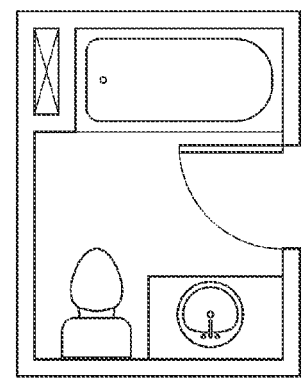
FIG. 3-D
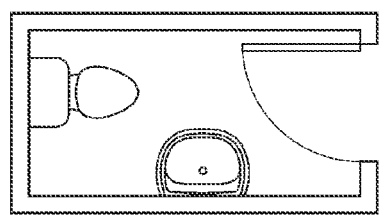
FIG. 3-E

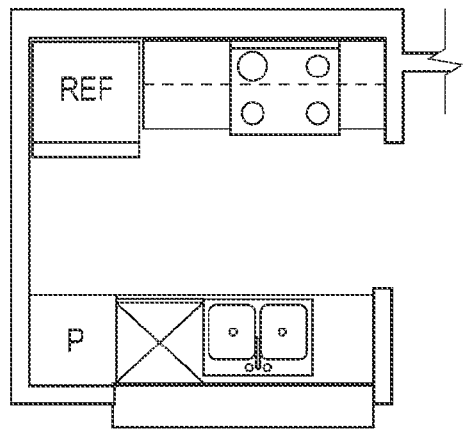
FIG. 4-A
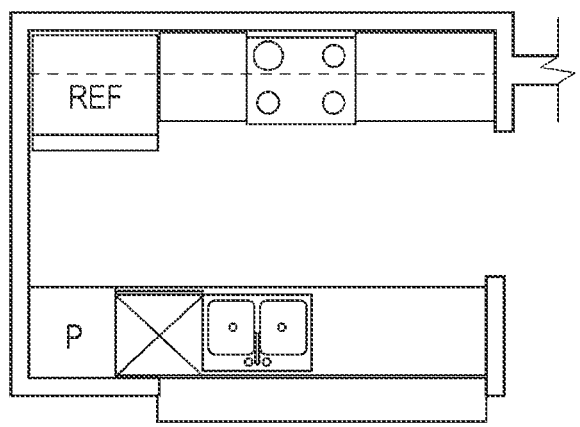
FIG. 4-B
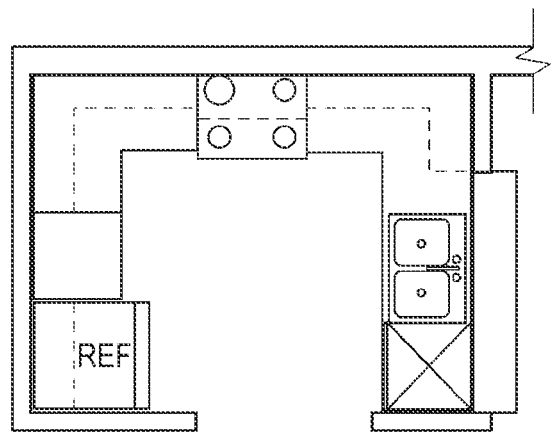
FIG. 4-C

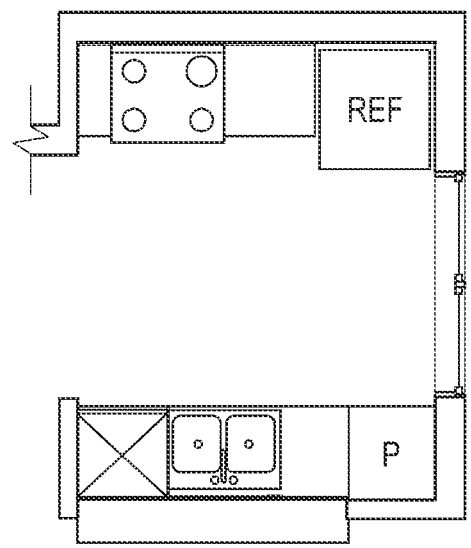
FIG. 4-D
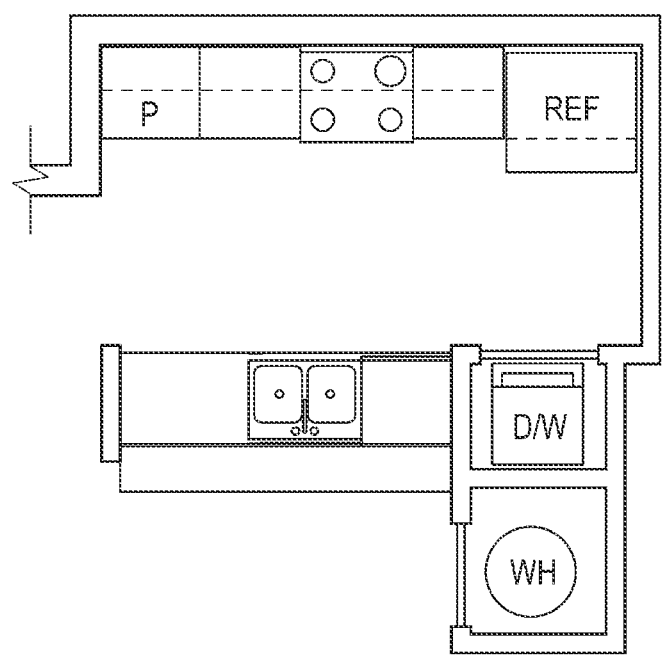
FIG. 4-E

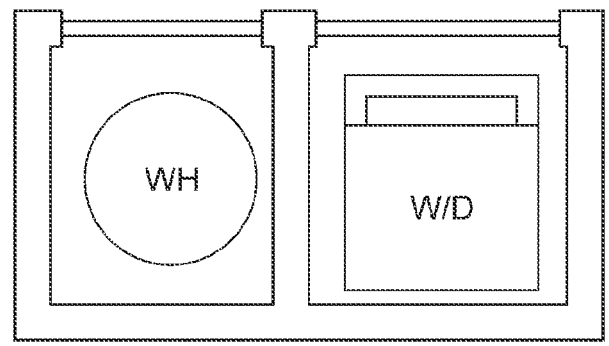
FIG. 5-A
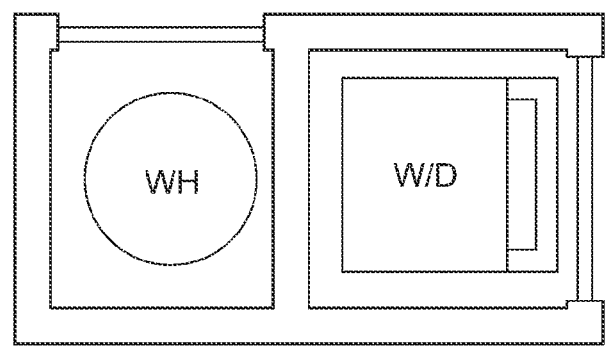
FIG. 5-B
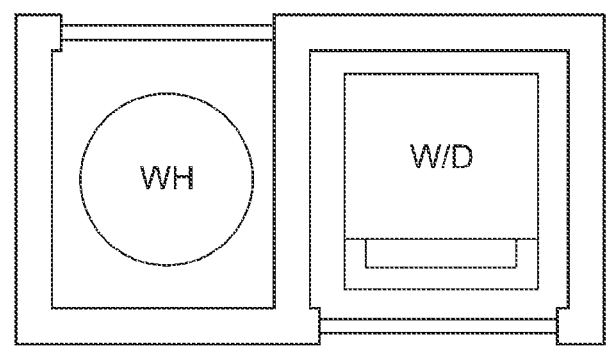
FIG. 5-C

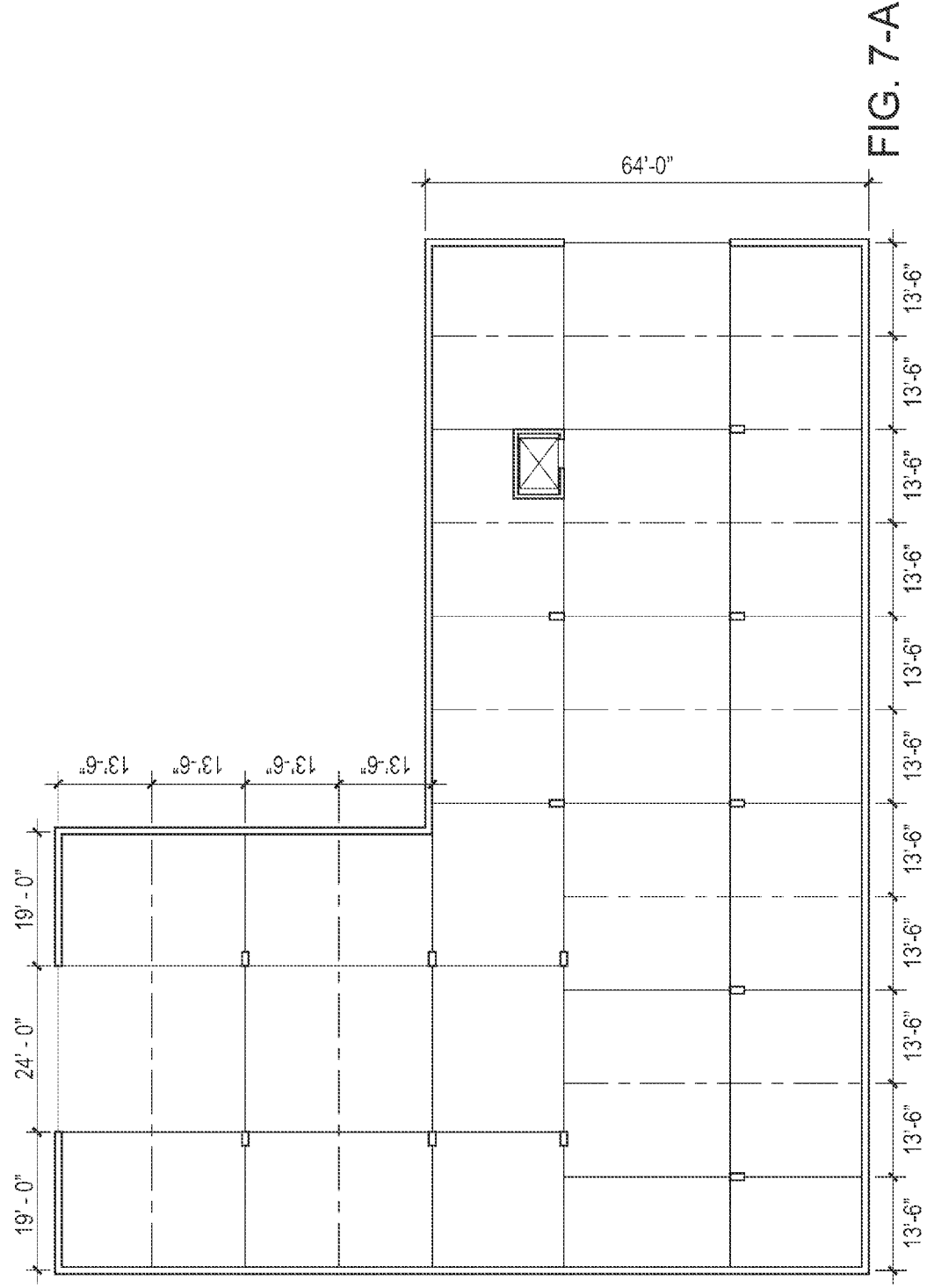
FIG. 7-A

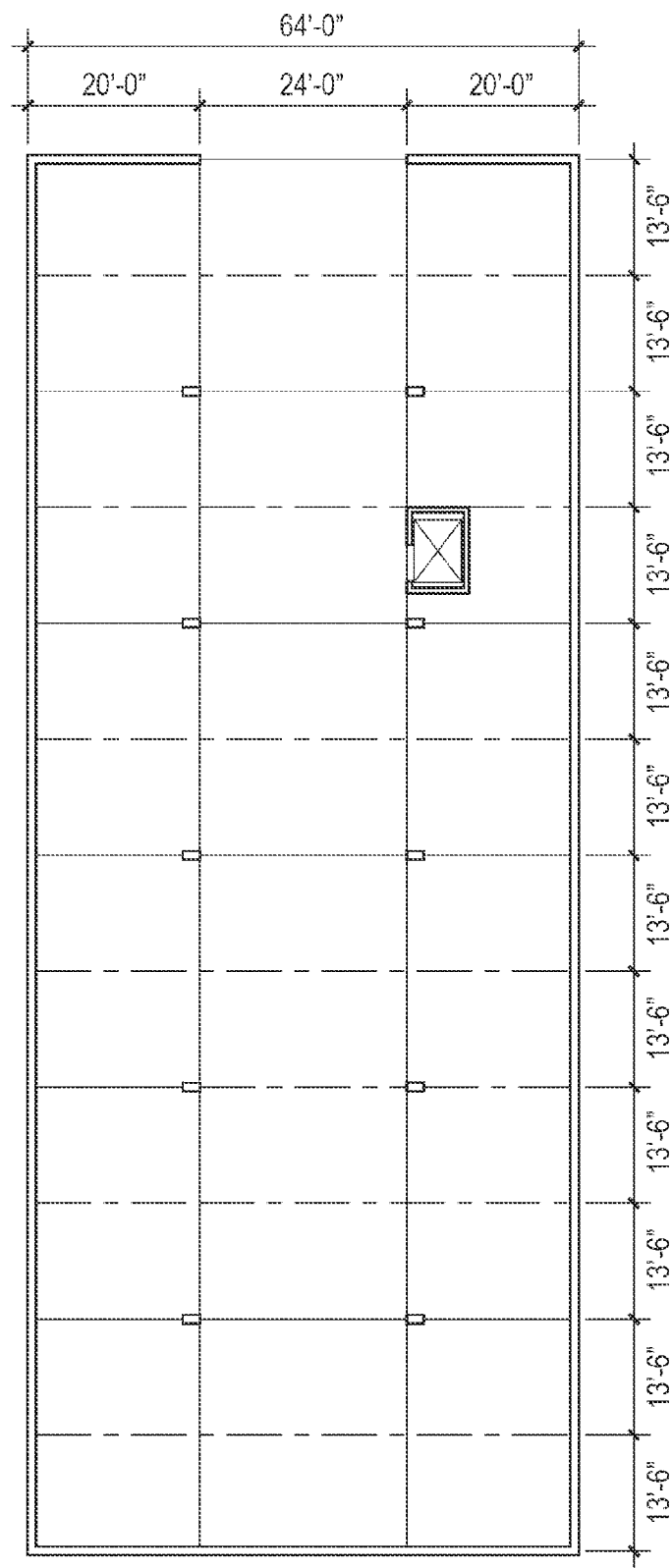
FIG. 7-B

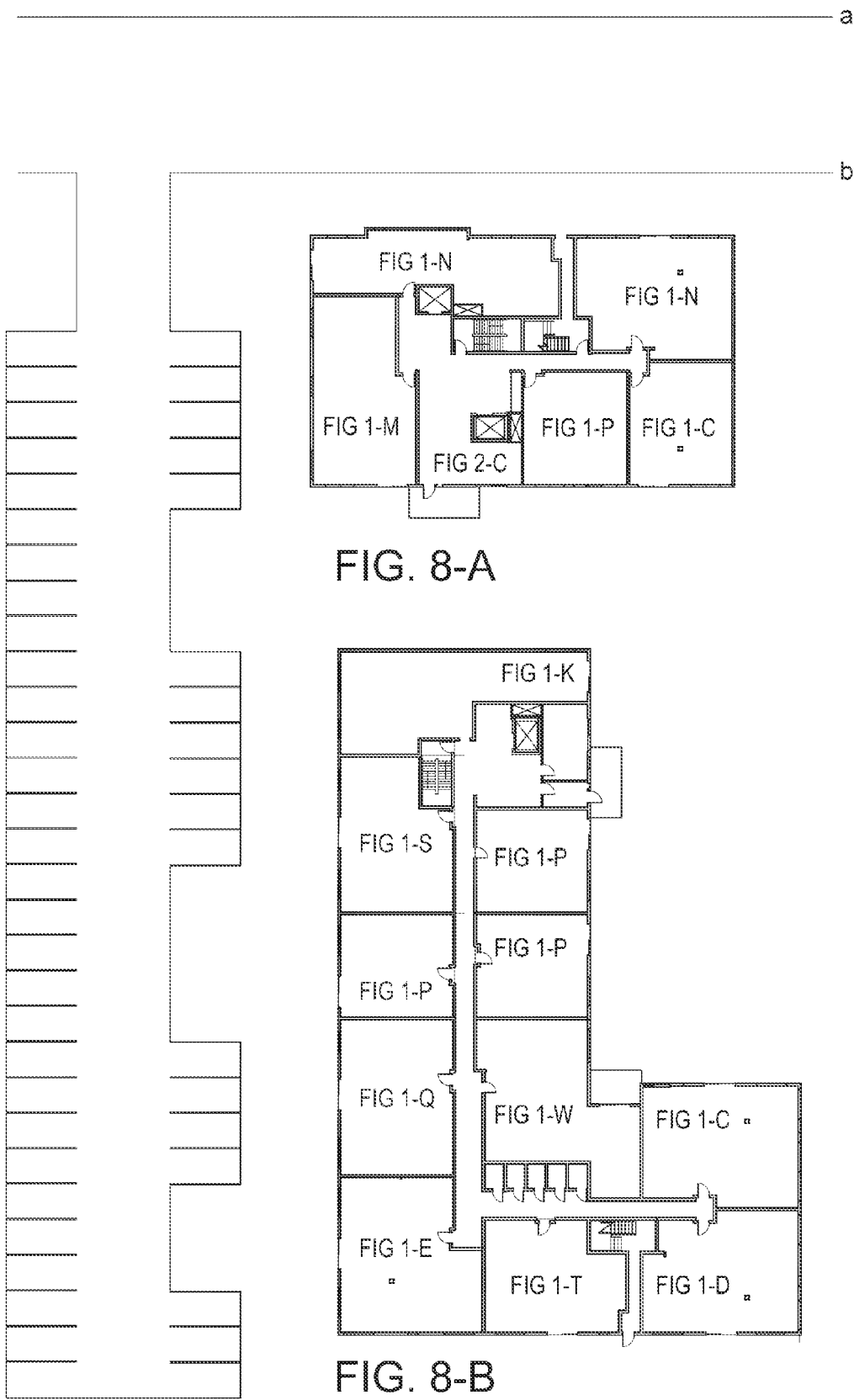
FIG. 8-A
FIG. 8-B

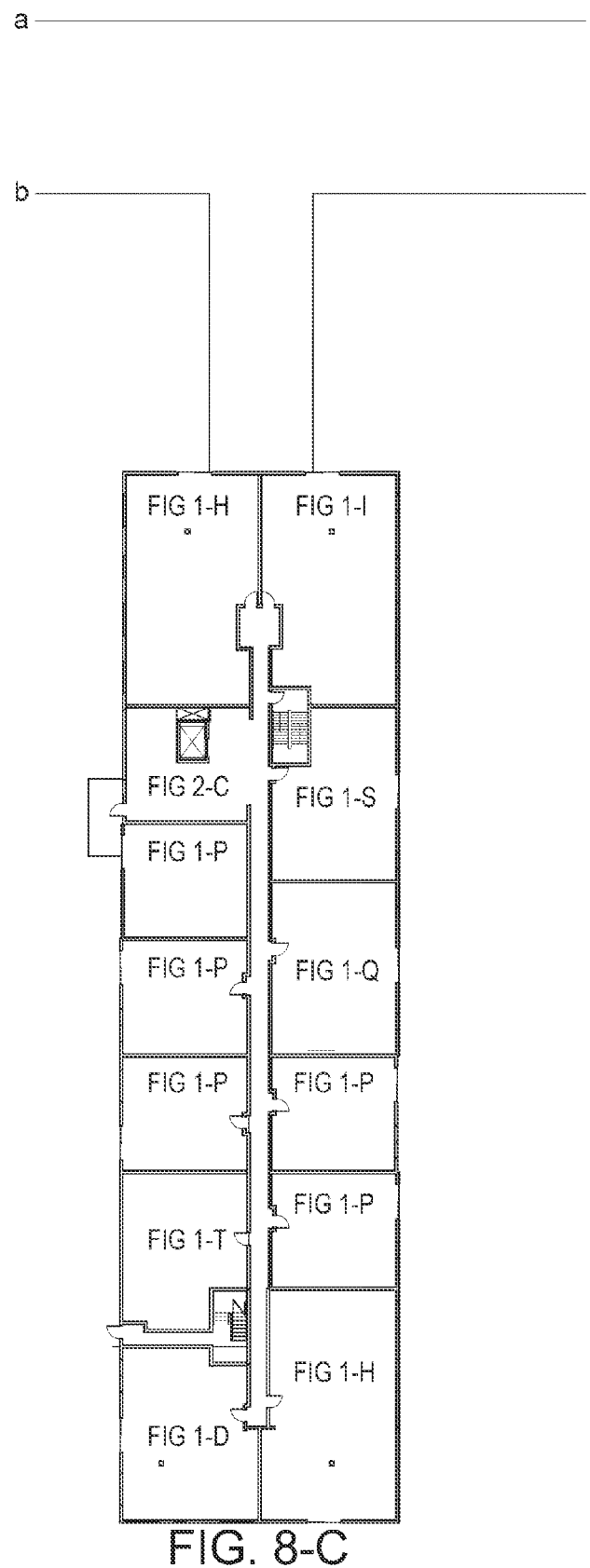
FIG. 8-C

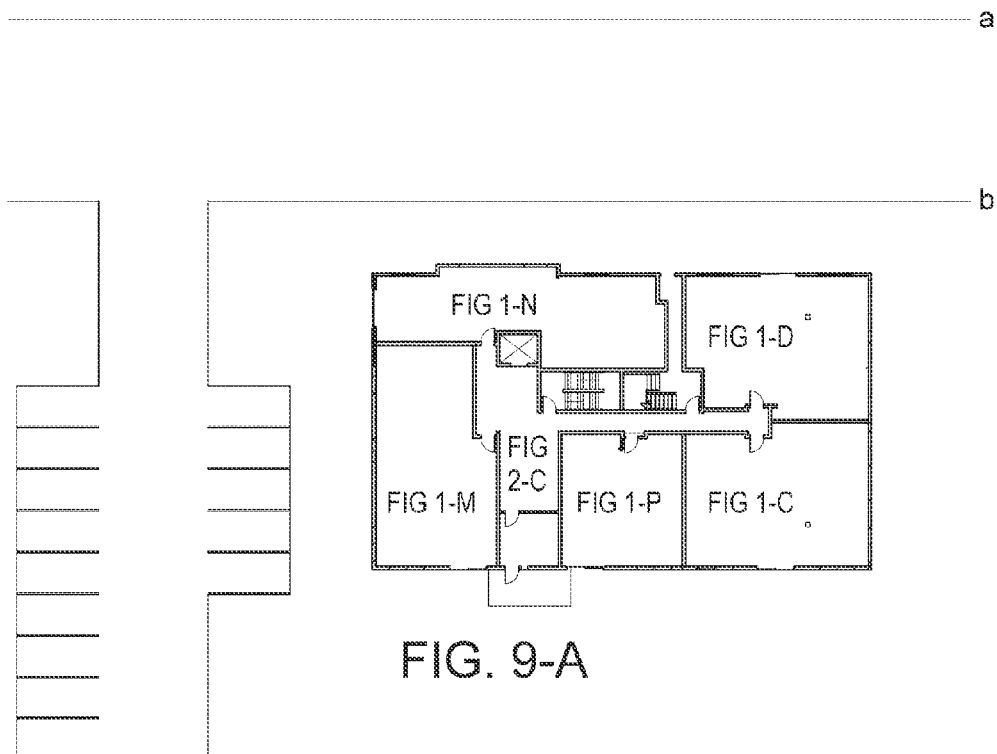
FIG. 9-A
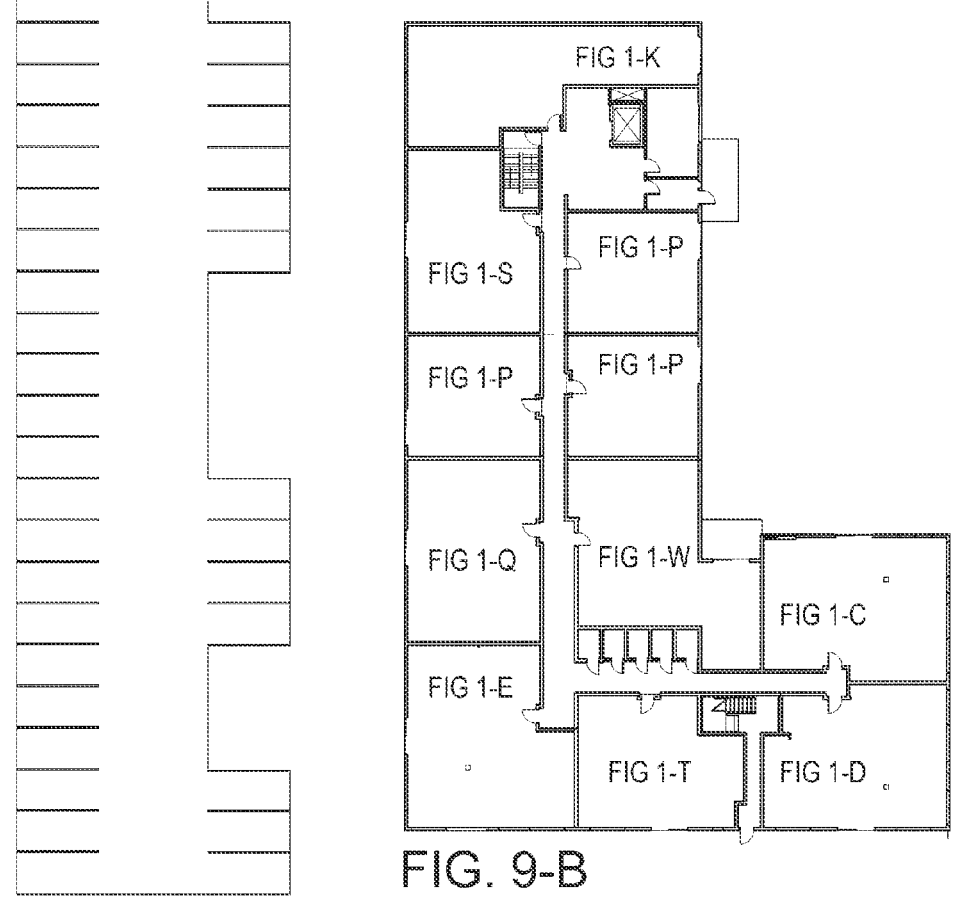
FIG. 9-B

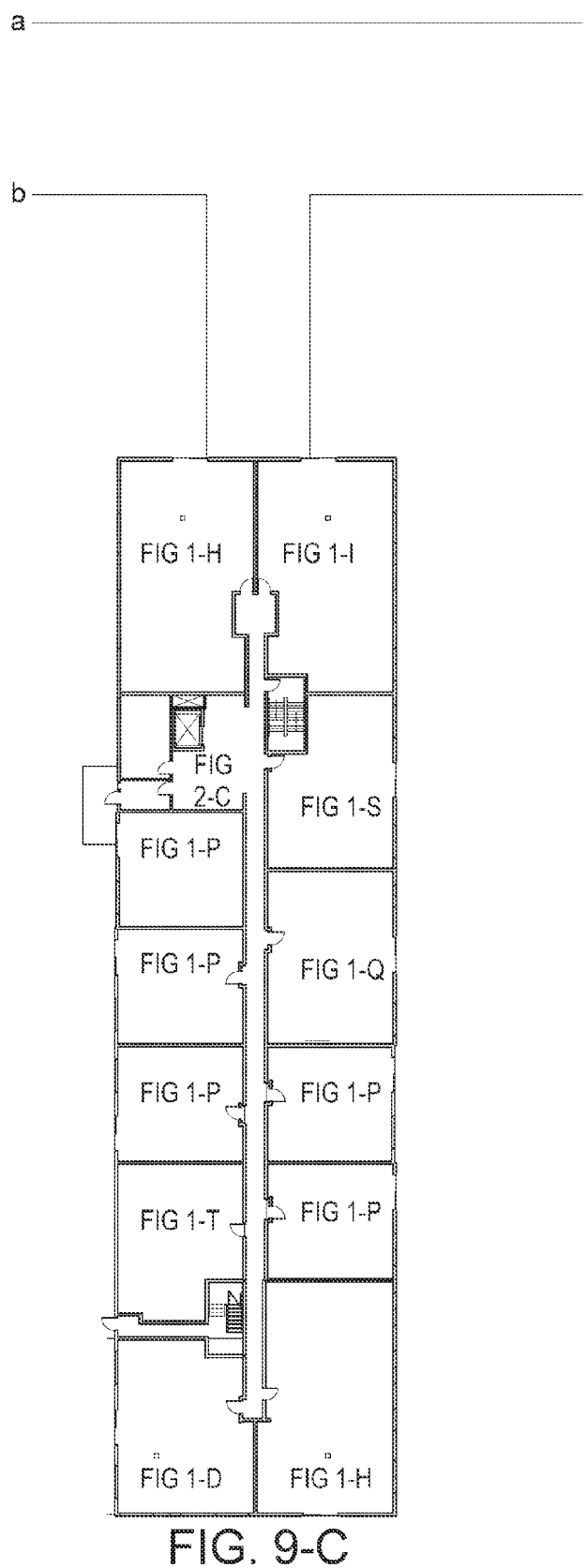
FIG. 9-C

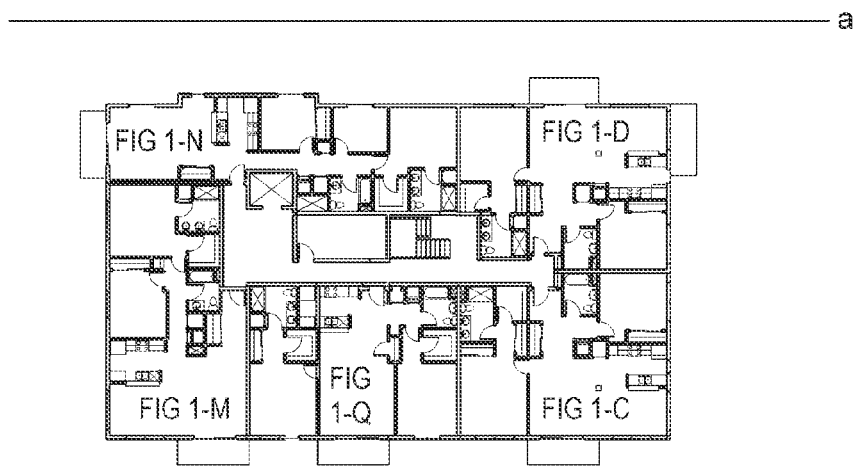
FIG. 10-A
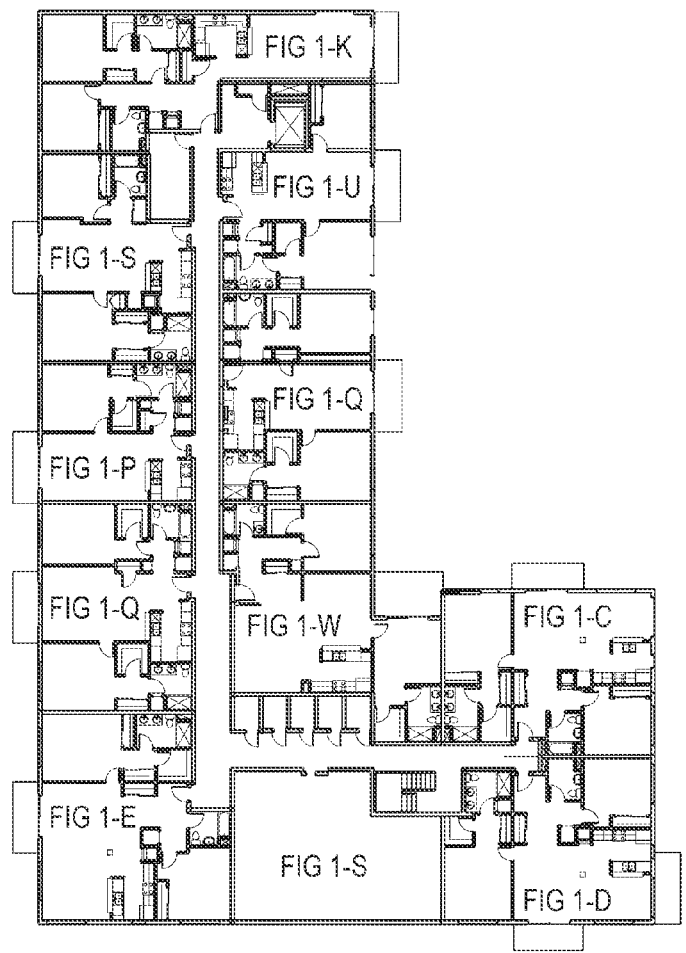
FIG. 10-B

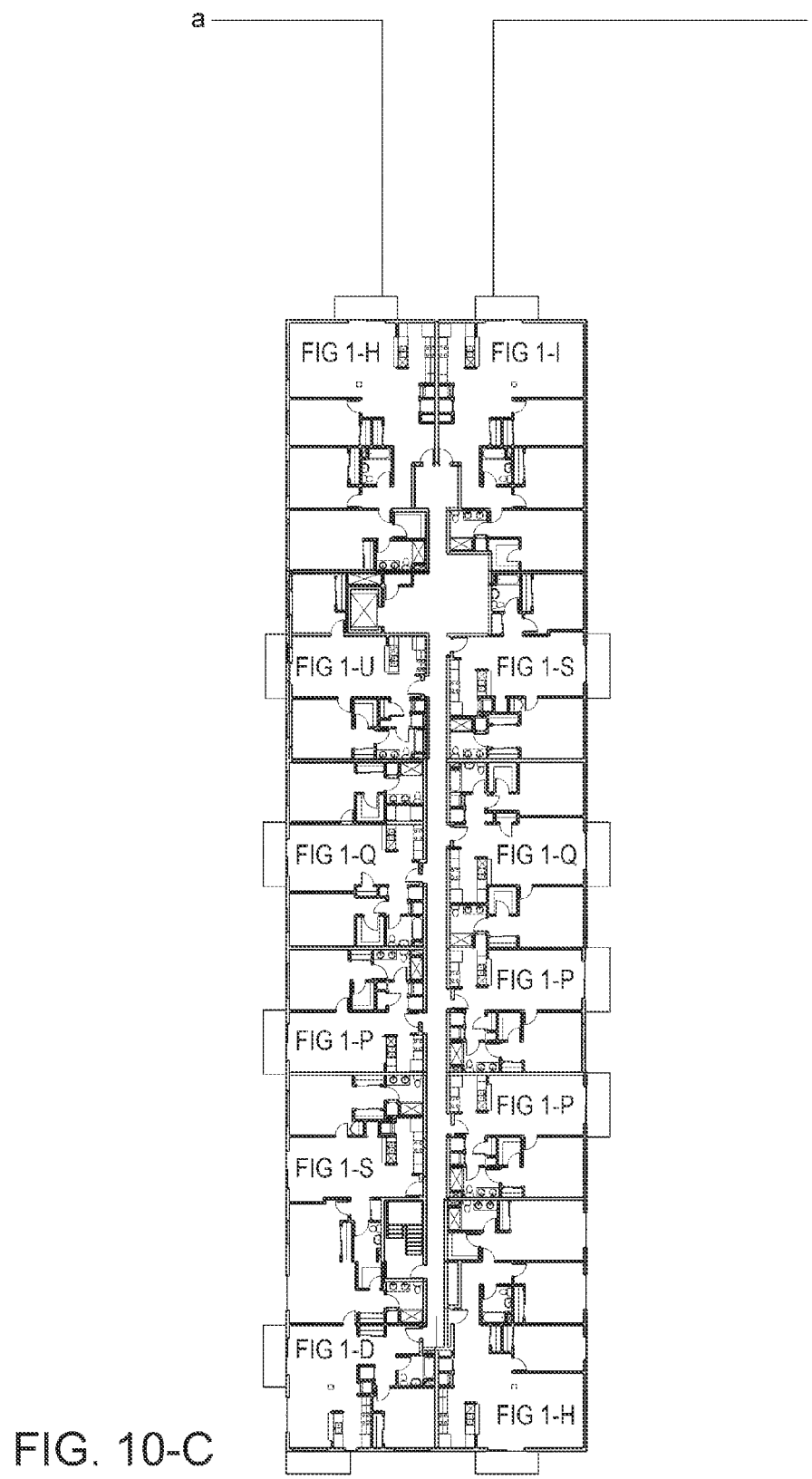
FIG. 10-C

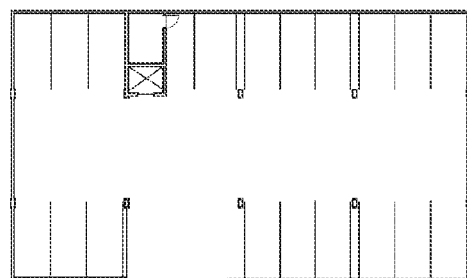
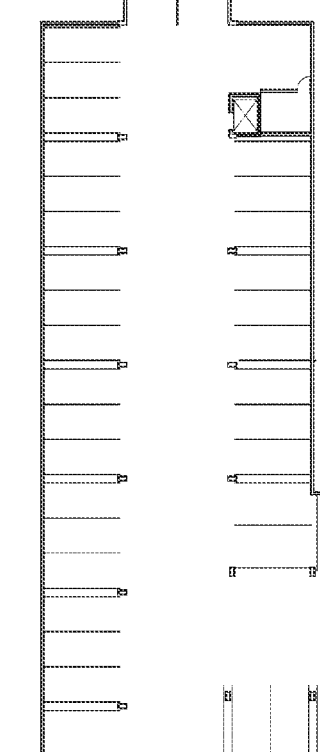
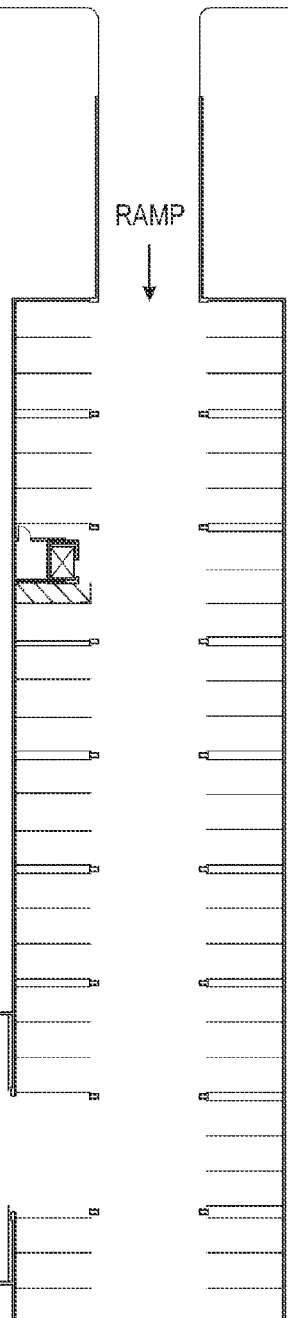
FIG. 11-A
FIG. 11-B
FIG. 11-C

COMPUTER CODE AND METHOD FOR DESIGNING A MULTI-FAMILY DWELLING

CROSS REFERENCE TO RELATED APPLICATION

The present application is a continuation of U.S. patent application Ser. No. 12/114,526, filed May 2, 2008, now U.S. Pat. No. 8,160,842, which claims priority from provisional application 60/927,768 filed May 4, 2007, the full disclosures of which are hereby incorporated by reference herein.

BACKGROUND ART OF THE INVENTION

A design of a multi-family dwelling can be a labor intensive project for an architect. The design must satisfy numerous laws and building codes. Any building site often differs in terms of zoning constraints such as, size, shape, location relative to the sun, surrounding buildings, and topography of the land. Market forces in a given area also dictate the number of bedrooms and finishings of the units in the building. Any changes that the architect makes must accommodate all the building codes, laws, and structural requirements of the building.

Most sites for multifamily housing differ as to size, zoning limits and specific site conditions (view, abutting buildings, sun orientation, access, etc.). Therefore, buildings for these sites must be custom designed.

Building projects typically involve architects, engineers, consultants, and a contractor who work through a design with the developer/owner, one piece at a time. Each piece is often debated until compromise is reached (the bath tile will be this, the kitchen faucet will be that, etc.). This process can take months and sometimes years. Along with other problems, this fragmentation contributes to higher building costs. This is a particular concern for those of us who would like to see widespread development of environmentally friendly ("green") residential buildings. While there have been many examples of very green buildings, and even some very green housing (most often single family), there are very few examples of market rate green residential buildings that do more than fit LEED certification.

Computer software has made it quicker and easier to make changes to building designs. For example, the Autodesk® AutoCAD® Revit Architecture software is gaining acceptance among architects. This software maintains three-dimensional views of the design. Changes to the design are automatically coordinated.

SUMMARY OF THE INVENTION

In accordance with an embodiment of the invention, a collection of dwelling unit module designs is stored for use in designing multi-family dwelling buildings or multi-family portions of mixed use buildings including retail and commercial located below residential units. Each of the dwelling unit modules fits uniform grid intervals defining a structural support system. A dwelling unit module may correspond to a single floor or may be representative of a vertical stack of dwelling units. According to one specific aspect of the invention, the grid intervals are also used to organize a parking layout in an outline of the building. The parking spaces are located to fit in consonance with structural supports in the system defined by the grid intervals.

The collection of dwelling unit modules can be used to make a complete layout of the dwelling units in the building using only modules from the collection. The collection of module designs includes at least an end module to be located at an end of the building and an interior module to be located between two modules. Each of the dwelling unit modules accommodates a corridor entrance. At least one of the module designs accommodates a stairway platform.

In accordance with further aspects of the invention, the collection may further include an outer corner module and an inner corner module to accommodate a building design with a right angle bend. The collection of module deigns may further include a design for an exit stairway interior module having a stairway and exit passage. A corresponding design for an interior module having a perimeter matching that of the exit stairway interior module would also be included so that the exit stairway module can be placed on a ground floor level and the matching module may be placed above it. The collection may further include a design for an interior module with an elevator shaft and an entrance to the elevator from the corridor. In accordance with further aspects of the invention, the collection may include a design for a module including a plurality of storage closets accessible from the corridor.

The collection of dwelling unit module designs is most advantageously created in advance and independent of subsequent use of the collection to design a specific multi-family dwelling building for a specific site and project. In the case of modules that are representative of a stack of dwelling units, each stack will have specifically modified units for the top floor and for the bottom floor.

Also in accordance with an embodiment of the invention, the collection of dwelling unit module designs are stored. In accordance with further embodiments, grid intervals are less than 14 feet in width so that, if modular building is desired, prefabricated modules corresponding to dwelling units can be transported over roads to the building site. A computer system is provided with a graphical interface such that an outline may be defined for the building on a representation of the building site while making use of the grid intervals to help size the outline. The building outline is stored on the computer system and the system is then used to access a collection of modules. The outline can then be filled with a pattern of modules from the collection so as to design the complete building. The design provides for access, egress and vertical circulation in the building. The design is stored in the computer system for later use in creating drawings for construction of the building.

In accordance with a specific embodiment of the invention, the dwelling unit module designs are three-dimensional. In a more specific embodiment, each module is completely dimensioned and the materials completely specified to a level constituting construction documentation. Thus, upon filling the outline with a pattern of modules, a multi-family dwelling building has been designed to the level of construction documentation. In accordance with another aspect of the invention, computer code for automatically filling the outline with a pattern of modules from the collection may be provided. A set of predefined rules may assist the computer system in filling out the pattern. In addition, each module may further contain exterior elements to complete the exterior design of the building as well.

The invention may be provided as a computer program product that contains or receives the collection of three-dimensional dwelling unit module designs, said collection being sufficient to produce a complete layout of a building using modules from the collection. The product further includes program code for creating a graphical interface that enables a user to lay uniform grid intervals over a representation of the proposed building site. The program code enables user to design an outline of the building and to fill the outline with a pattern of modules from the collection.

By reusing dwelling unit module designs, design costs can be significantly reduced. Moreover, by refining the dwelling unit module designs with a particular eye toward green building considerations, the cost of such environmentally-friendly housing can be made affordable so that its use can become more widespread. Other objects and advantages of the invention will become apparent during the following description of the presently preferred embodiments of the invention taken in conjunction with the drawings.

BRIEF DESCRIPTION OF THE DRAWINGS

FIGS. 1A-1Z are schematic design plan views for each of the dwelling unit module designs in one embodiment of the collection of the present invention.

FIGS. 2A-2D show schematic design plan views of stairs, lobby and mechanical rooms to complete the overall building.

FIGS. 3A-3E show schematic design plan views of bathroom designs.

FIGS. 4A-4E show schematic design plan views of kitchen designs.

FIGS. 5A-5C show schematic design plan views for washer-dryer/mechanical rooms.

FIGS. 7A and 7B are sample building outline schematic drawings with grid intervals.

FIGS. 8A-8C are schematic drawings of building outlines filled in with dwelling unit module designs from FIGS. 1A-1Z.

FIGS. 9A-9C are schematic design plan views for a first floor in the building layouts of FIGS. 8A-8C.

FIGS. 10A-10C are schematic design plan views of a second or higher floor for the building layouts of FIGS. 8A-8C.

FIGS. 11A-11C are schematic design plan views for a parking layout for the building layouts of FIGS. 8A-8C.

DETAILED DESCRIPTION OF SPECIFIC EMBODIMENTS

Figure 6:
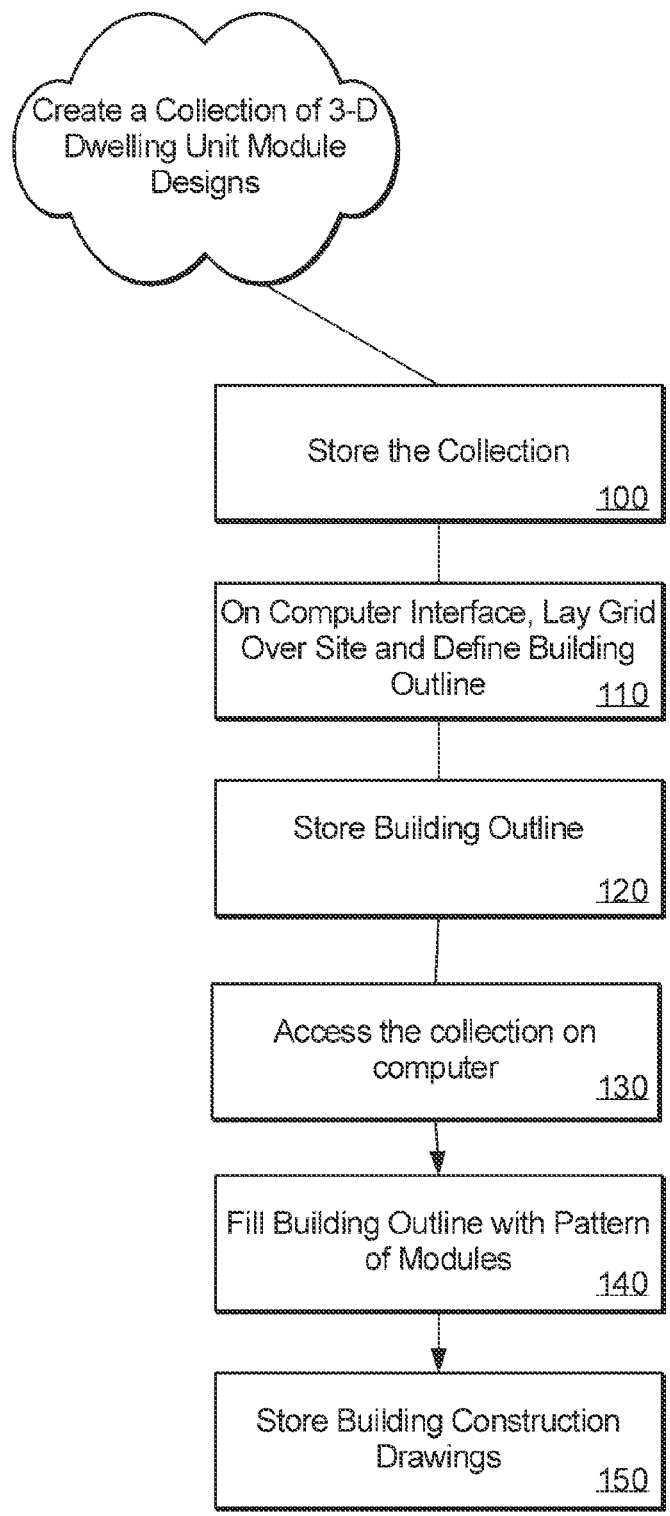
FIG. 6 is a schematic block diagram including a method of an embodiment of the present invention.

In accordance with an embodiment of the present invention, a collection of dwelling unit modules has been devised that can be used to provide all dwellings in a complete multi-family dwelling building design. It is understood that many other collections may also be devised that satisfy the requirements of the present invention and thus still fall within the scope of the present invention. Each module design will be highly evolved over time. The module design may be created independent of a specific project to satisfy criteria of code standards, plan efficiency, sound transmission, MEP, Americans with Disabilities Act (ADA), sustainability, costs, operations, construction methods and amenities among other requirements that architects face in designing buildings. The design for a module may be refined and approved over time to enhance the value of the collection. A complete three-dimensional module design will include a plan drawing, section drawings and elevation drawings. Moreover, these may be construction level drawings with a written specification identifying all of the materials required. The material and labor content of each dwelling unit module can thus be carefully calculated for use in accurate cost projections and contractor material take-off projections. In addition, by considering a dollar per square foot factor relating to sales value or projected rents, the plans for the building can be used to make income projections. The plans can easily provide the square footage of the building as a whole or of the living space within the building. These quickly determinable cost and income projections can be used by a developer before purchasing a property to calculate the land value that can be afforded in view of the expected market value for the finished building. The completed drawings and specifications can also be used to quickly and reliably predict the energy inflow from the roof and ground source systems, and to project the heat loss and heat gain in each individual stack of modules.

Each module design fits uniform grid intervals that defines a structural support system. In other words, walls or isolated structural supports are located within a dwelling unit design for ease of connection and maintenance of the structural support system throughout the building. In accordance with a specific embodiment of the invention, the modules are all designed to fit in a building that is built over a parking garage. In accordance with one standardized parking garage design, structural supports are located at intervals of 27 feet into which three parking spaces can be fit widthwise. The width of the spaces sets the mid-span structural support at intervals of 13 feet, 6 inches (one-half the 27 foot interval). Thus, a grid corresponding to 13 foot, 6 inch separations is formed, capable of supporting housing above a parking garage. The dwelling unit module designs are developed so as to fit walls and supports onto the grid. Given that in most states, up to 14 feet in width can be transported over a road, setting the grid intervals at less than 14 feet (e.g., 13 feet, 6 inches) allows for transporting panels or sections of dwelling units constructed in factories over the road on a trailer truck. Thus, it is possible but not necessary to take advantage of both modular or panel design and construction.

The dwelling unit module designs may be developed independently of any specific building project. Not only must the module designs match up with the structural support system grid, but vertical circulation through the building in the form of ventilation, plumbing, elevators, stairways, vertical chases, etc, must be provided for in the module designs so that it is possible to design a complete building with resort only to the modules in the collection of module designs.

The building design can be completed by stacking identical dwelling units one on top of the other depending on the number of floors contemplated for the building. A roof would also need to be added. Alternatively, the building design can be further accelerated if the dwelling unit module designs correspond to a vertical stack. A stack would include a bottom floor unit and a top floor unit and any number of floors in between. Additional floor units are easily added because the plans for each such middle floor are essentially identical. The top unit in the stack defines the roof, roof waterproofing, roof drainage, ventilation intakes and exhausts and the possibility of additional equipment such as wind generators, photovoltaics or satellite dish. The bottom unit for use as a first floor may include a two hour fire rated floor, a heated plenum between the unit floor and the basement/parking garage, added structure to accommodate added loading, horizontal hookups for gas, electric, cable, sewer, storm water, fire protection and inter building communication systems. Any number of middle floor units can be fitted between the special top and bottom units.

Referring now to FIGS. 1A-1Z, a collection of dwelling unit module designs shall be described in greater detail. The figures merely show a schematic plan view, but in accordance with an embodiment of the invention each dwelling unit module design can be associated with three-dimensional construction level drawings. This can be done one floor at a time or the dwelling unit module designs may each be provided as a complete vertical stack. Indeed, each module may be associated with full working drawings and specifications.

FIG. 1A is an end module characterized by walls that accommodate a corridor across a portion of the unit. As seen in FIG. 1A, the entrance to the unit opens into the corridor. A wall juts out from the end unit signifying the end of the corridor run. Furthermore, this end unit is an open unit which means it has windows or like openings along more than one exterior wall. This unit has windows along two orthogonal exterior walls. Vertical circulation for the plumbing is shown adjacent the master bathroom. To match up with the grid, the walls of the master bedroom and living room are each 13 feet, 6 inches apart.

FIG. 1B is also an end unit but has the feature of a stair platform located behind the master bathroom. Any code requirements as to distances between the stairs and an entrance way to the corridor are accommodated by the dwelling unit design. It is noted that FIGS. 1A and 1B have evolved since the filing of the provisional patent application. The ability to refine the module designs over time is a powerful way in which embodiments of the present invention can be used to leverage expertise and building experience in successive building designs.

FIG. 1C is a two-bedroom end unit without a stair platform. Vertical circulation openings are provided adjacent both of the bathrooms in this unit. To accommodate the grid of structural supports, an isolated structural element is provided in the wide expanse of the living room area.

FIG. 1D is similarly a two-bedroom end unit, however in this case accommodating a stair platform behind the master bathroom.

FIG. 1E is another two-bedroom end unit. This unit has been designed in particular for use as an outside corner unit.

FIG. 1F shows another end unit but in this case it is a closed end. Windows appear only along one wall of the dwelling unit. A closed end unit may be used for a building that butts up against another building for example.

FIG. 1G is another two-bedroom closed end unit, in this case including a stair platform located behind the second bathroom.

FIG. 1H is a three-bedroom unit, suitable for buildings in which such a more expensive unit may be supported by the market conditions. The unit is an open end with windows, exterior door or openings along two orthogonal exterior walls. FIG. 1I similarly shows an open end three-bedroom unit but in this case it accommodates a stair platform behind the master bathroom. FIG. 1J is a larger open end three bedroom unit.

FIG. 1K is an end unit, two-bedroom dwelling that accommodates a stair platform by the entry. The unit may be open or closed depending on whether the living room is provided with a window or windows along the back wall. This unit extends across an entire floor as can be seen by the windows in the bedrooms and on the opposite wall at the end of the living room. Similarly, FIG. 1L extends across an entire floor but it is a larger unit including three bedrooms, and it includes a corridor stairway associated with the unit design.

FIG. 1M is another design for an open end two-bedroom unit.

FIG. 1N is an open end three-bedroom unit that includes a stairwell as well as an elevator shaft. Indeed, this unit accommodates a second stairwell, adjacent the first stairwell making it suitable for use in a small size multi-family dwelling in which the two stairwells required in the building are near one another.

FIG. 1O is an open end two-bedroom unit and includes a living room and dining room that extends out beyond the end of the building with respect to its adjacent end unit. As seen in plan view, the living room has window openings on three walls. This unit includes accommodation for a stairway behind the master bathroom.

FIG. 1P is an interior one-bedroom unit. As shown, this unit has only one exterior wall with windows. The unit is designed to fit between two other dwelling units.

FIG. 1Q is a two-bedroom interior unit with the living room located in the center of the overall unit.

FIG. 1R is an interior two-bedroom unit with the living room positioned to the side. It is noted that the structural grid is maintained at the 13' 6" grid interval. Nevertheless, conventional structural engineering can accommodate offset walls within a unit such as seen here in the living room to expand the living room space.

FIGS. 1S and 1T should be considered together. FIG. 1T is a stairway exit unit. If the building is designed so that the ground level is even with the first floor, the exit from the stairwell can be provided out through the first floor. Thus, the parking lot would be built below ground level in this area. To satisfy fire and building codes, the stairwell must provide access to the outdoors. In the case of FIG. 1T, an exit passage from the stairwell to the exterior wall at ground level is provided. FIG. 1T is a one-bedroom with den interior unit.

FIG. 1S is provided with the same wall perimeter as provided for FIG. 1T. Thus, the unit with the stairway exit may be located on the first floor while in higher floors; FIG. 1S with the matching outer perimeter may be used in the building. Both the 1T and 1S units accommodate the footprint of the vertical opening of the stair with treads and risers and midlevel platform. In an embodiment of the invention where each dwelling unit module design is a vertical stack, only one of 1S or 1T is needed to represent the vertical stack in which the 1T is the ground floor and 1S is used for each of the midlevel floors. The representative drawing of the stack may be used in the process of filling the building outline. The vertical stack will provide the drawings and specifications for all floors in the stack.

FIG. 1U is an interior unit that includes an elevator shaft. An elevator is required in a multi-level, multi-family dwelling and so it is convenient to include an elevator in at least one of the dwelling unit modules in the collection.

FIG. 1V is designed as in inside corner unit. Such a unit is useful for making a building that takes a right angle bend. The corridor for the building would extend around the outer periphery of the larger walls of this unit. It is noted once again as for all of the unit modules; this unit's walls are 13 feet, 6 inches apart to accommodate the grid of structural supports. The module unit of FIG. 1V is further characterized by a plurality of storage closets that open into the corridor of the building.

FIG. 1W is an interior unit with three bedrooms.

FIG. 1X is a three bedroom interior unit that accommodates a stairway.

FIGS. 1Y and 1Z are particularly useful in completing a T-shaped building. FIG. 1Y is a two bedroom inside corner unit. FIG. 1Z is a one bedroom inside corner unit. As with any of the units in the collection, a mirror image of the design may be used in filling the outline and designing the building.

In accordance with embodiments of the present invention, the dwelling unit module designs in a collection may be created in advance of and independent of using the collection to complete the dwelling unit designs for a particular multi-family dwelling building. The designs in the collection may be improved upon based on construction experiences with an early building. Such improvements inure to the benefit of later designed buildings. In this manner, the individual dwelling unit designs can evolve and become perfected over time. Later building designs thus automatically reap the benefits of earlier improvements in dwelling unit module design and the building can easily be designed by simply selecting from among the dwelling units in a collection.

The collection of dwelling unit modules are sufficient to populate an entire multi-family dwelling building with dwelling units. Indeed, they complete almost the entire building design. Over time, additional unit modules may be added to the collection allowing for a wider variety of units and buildings. In FIGS. 2A-2D, a few additional building elements are included for final completion of a building. These may be separate elements that can be added onto a building or they may be included as part of a dwelling unit module when that module is a vertical stack (described below). Some of the module units accommodate a stairway as shown in FIG. 2A. The stairway specifications and materials of this separate module can be added into the design fitting within the stairway accommodating portions. At the garage level, a couple of additional building structures may be included. For example, when the garage is at ground level, it will provide the exit from the stairwell. A stairwell exit passage through the garage level is shown in FIG. 2B. The bottom of the elevator and an adjoining mechanical room will reach down into the garage and is shown in plan view in FIG. 2D. At the lobby level, an entrance way and access to the elevators is often required. FIG. 2C is an example of one lobby that can be inserted as a module into the design of the first floor of a multi-family building dwelling. Alternatively, if the dwelling unit module designs are vertical stacks, the lobby can be part of a stack instead of its own separate module.

Modular design of individual rooms may also assist in the creation of the dwelling unit modules. For example, as shown in FIGS. 3A-3E, a number of different bathroom designs are shown in plan view. Each such bathroom design may be perfected separately and inserted into the dwelling unit module designs for facilitating their creation. Likewise, FIGS. 4A-4E illustrate five different kitchen designs. FIGS. 5A-5C illustrate three similar mechanical room designs for a water heater and washer/dryer. Thus, the mechanical rooms can be slightly altered depending on access and yet each design accommodates the same relationship of water heater and washer/dryer. Thus, costs may be reduced by standardization. The modular room and closet designs allow one architect to work on the individual rooms independent of and not time related to another architect creating the overall dwelling unit designs. It may also be possible to create more than one design for a given kitchen or bathroom footprint.

Referring now to the embodiment of FIG. 6, the collection of dwelling unit module designs can include completed construction level drawings and information. The module unit will include plan drawings, section drawings and elevation drawings along with a written specification that identifies all of the materials and costing information. The drawings may, optionally, further include exterior elements such as exterior wall materials and specs and balconies and specs for same and interior corridor wall designs and specs as well. This collection of unit module data is stored in a computer system 100.

As is known in the computer art, a graphical user interface is generated by a computer program. Such an interface can be displayed on a stand alone computer or on networked computers or workstations or may be available over the internet for use in connection with remote internet access devices or computers. For example, a FLASH® based website may be implemented for carrying out embodiments of the invention. Information about the building site is entered by a user through the interface. A user of the computer program in accordance with the present invention can design a building for use on a site of any arbitrary dimensions and topography. The user may locate a building outline anywhere on the site, keeping in mind or programmatically controlled to satisfy zoning regulations, building codes and setbacks. This outline will be fitted to the site of available space in a manner that gives consideration to sun and view, pedestrian and vehicular entrances to the site, site amenities, and the proposed number and type of units to be included in the proposed project. The uniform grid intervals are applied to the site to size an outline 110 that sets out the exterior walls of a multi-family dwelling building. FIGS. 7A and 7B each provides an example of a building outline illustrating the application of the grid intervals over the outline. A uniform grid interval of 13 foot, six inch widths is repeated over the outline to define a structural support system for the building. Vertical structural supports are shown at 27 foot intervals. Support beams will extend from the surrounding foundation to the structural supports. Perlins may be extended from mid-beam to the foundation wall. By designing the dwelling unit module designs to fit the grid, walls and supports in the dwelling units are readily aligned with the structural support system, as needed. In the specifically described embodiment, the dwelling unit designs fit the grid by making use of the 13 foot, six inch intervals in laying out walls and supports. Variations exist to accommodate buildings with right angle bends, such as an L-shaped, U-shaped or T-shaped building. In specific embodiments, the grid intervals are laid out to provide a parking garage layout for use at the base of the multi-family dwelling building. In the present embodiment, two grid intervals, 27 feet, corresponds to the widths of three parking spaces. Structural engineers can use support beams, where necessary, to re-locate support poles in the parking lot beneath the building so as to provide sufficient space for cars to enter and leave the parking spaces. The lengths of cars are considered in setting the width of the building outline. In accordance with one embodiment, the building width is set at about 64 feet, but other widths may be contemplated requiring dwelling unit module collections accordingly sized.

The outline of the building is stored in the computer system 120. The building itself can be correctly and sufficiently designed by using the computer system to access the collection of dwelling unit module designs from the collection stored therein 130. A user on the graphic user interface can identify modules from the collection and place them onto the outline until a completed pattern of dwelling unit modules fills the outline 140. The program can be implemented with click and drag capability for user ease. The program may further be provided with mechanisms to facilitate completion of a building design, such as requiring the user to fill in the corner dwelling units first before entering other dwelling units and completing the entering of all the end units before entering the other units along the building corridor. In accordance with an alternative embodiment, computer code may be included, which can populate the entire outline with a pattern of modules on the basis of rules. A program can include such rules as requiring two stairwells in each building, placing end modules at the end of the building and interior modules between other modules along the length of the building and inserting corner modules into the corners of a building where a right angle bend is located in the outline. A program can require an elevator in the building. The interface may provide the user an ability to input additional rules such as including at least two or three bedroom units on each floor or using only one and two bedroom units. Once the outline has been filled with the pattern of modules, this pattern may be repeated for all floors in the building or there may be some slight variations. In accordance with an accelerated design process, each dwelling unit module is a vertical stack so that once the pattern of modules has been completed the building is practically completed. The program may then store the entire building and its drawings since each module is associated with construction level drawings. Thus, construction level drawings for substantially the entire building can be stored 150 or printed by the program. Using individual single level dwelling unit module designs, filled outlines for the first floor of three example buildings are shown in FIGS. 8A-8C. FIGS. 9A-9C provide in schematic form more details of the layout of the first floor of these buildings. The outline is filled in for the second and higher floors in FIGS. 10A-10C. Typically, these floors will have the same floor plan. But embodiments of this invention contemplate the possibility that larger units for upper floors that fit the grid and can be aligned over one and a half or more smaller units in lower floors. Whether filled automatically or manually, the selection of dwelling unit designs may need to conform to some rules of building construction. For example, each building has two staircases to provide adequate building egress. End modules, interior modules and corner modules are located accordingly. In accordance with an advanced version of the software, certain modifications to the designs may be preprogrammed. For example, if the building exceeds a certain number of floors, the size of the ventilation runs may need to be larger to meet code and air flow requirements. Preprogramming may permit the software to adjust the construction plans and drawings to show ventilation runs that meet these requirements.

Each building is complete with three-dimensional unit drawings and which will be completed to construction level information. The dwelling units for each building are all taken from the single collection of dwelling unit module designs.

In accordance with an embodiment of the invention that includes locating a parking lot beneath the buildings, FIGS. 11A-11C show parking lot layouts for the buildings of the previous figure. Advantageously, the parking lot layouts fit the grid so that parking spaces generally fit without undue obstruction from vertical structural supports. Also, this grid can easily accommodate retail and or commercial layouts in the case of multi-use buildings. By designing the dwelling unit modules to also correspond with the grid, the structural integrity of the dwelling units within the building is accomplished with a minimum of design effort. It is thus seen that the collection of dwelling unit module designs may be used for effective and efficient design of multi-level multi-family dwelling buildings in a variety of shapes or sizes.

Figure 12:
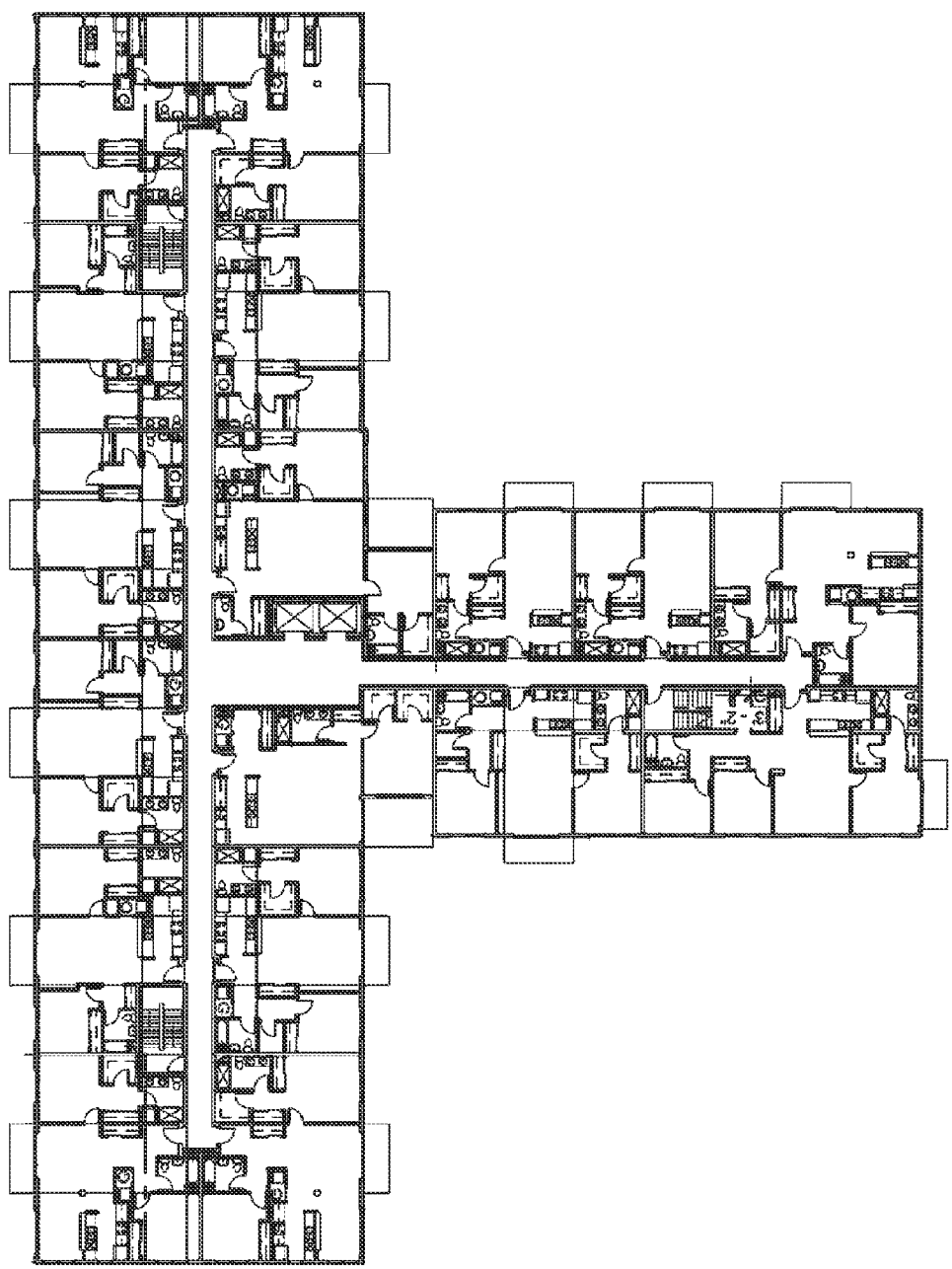
FIG. 12 is a schematic design plan view of a T-shaped building layout.
Figure 13:
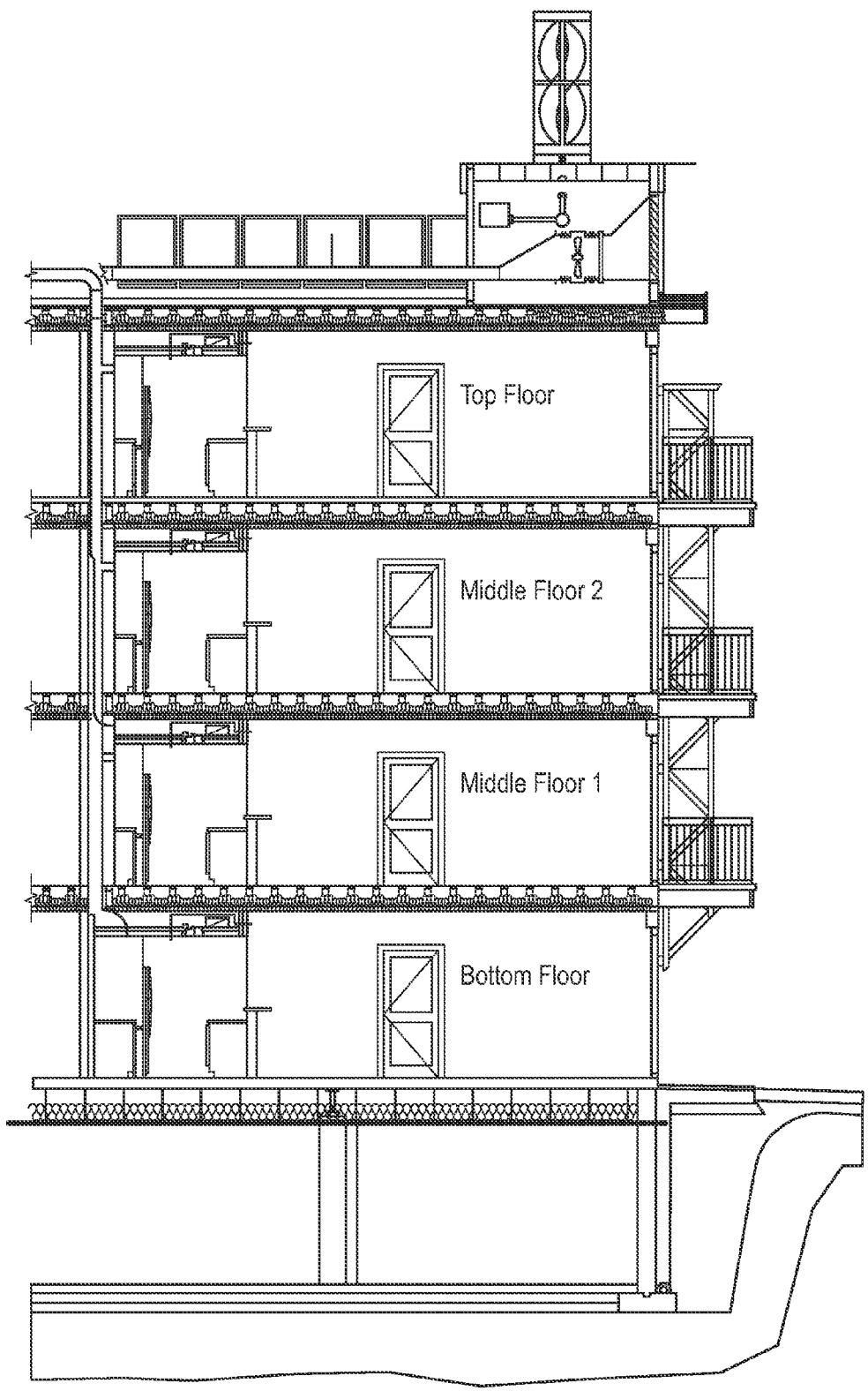
FIG. 13 is a schematic design side view of a vertical stack for use as a dwelling unit module design.

The use of dwelling unit module designs that are vertical stacks is illustrated with regard to FIGS. 12 and 13. A single building layout in FIG. 12 is sufficient to describe an entire building when the outline of the building is fully populated with stacks. The outline of FIG. 12 is T-shaped. Referring to FIG. 13, a vertical stack may include one or more middle floors as needed. It is useful for the top floor to include roof design drawings and specifications including equipment to be located on the roof. The bottom floor units will typically include enlarged space beneath the floor to accommodate horizontal hookups. Upon completing placement of dwelling unit modules into an outline, where those modules are vertical stacks, horizontal hookups are completed for utilities such as electric, gas, water, sewer, storm water, cable, inter building communication, fire protection, and the like.

Figure 14:
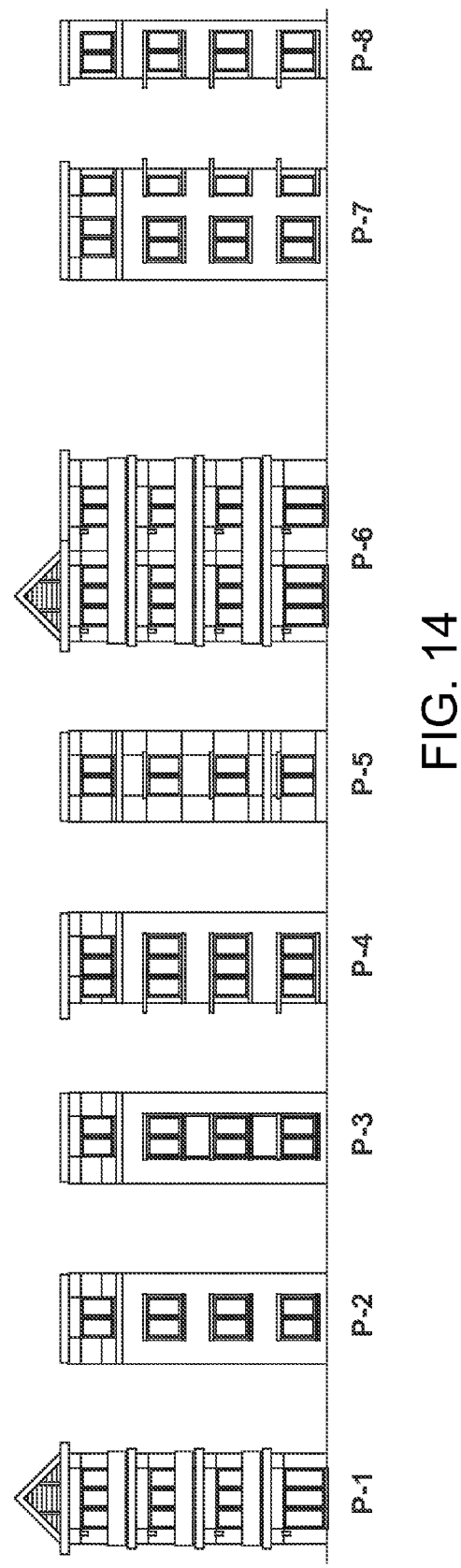
FIG. 14 is a collection of outer views of exterior wall designs.

The exterior of the building may also be designed by embodiments of the invention. Referring to FIG. 14, a variety of exterior wall designs are shown which may be associated with one or more dwelling unit module designs. The exterior wall design might be determined by the selection of an associated vertical stack. Alternatively, multiple exterior wall designs might be made available from which a choice is made. Of course, the exterior panel design can be extended upwards or downwards to handle more or fewer floors.

Figure 15:
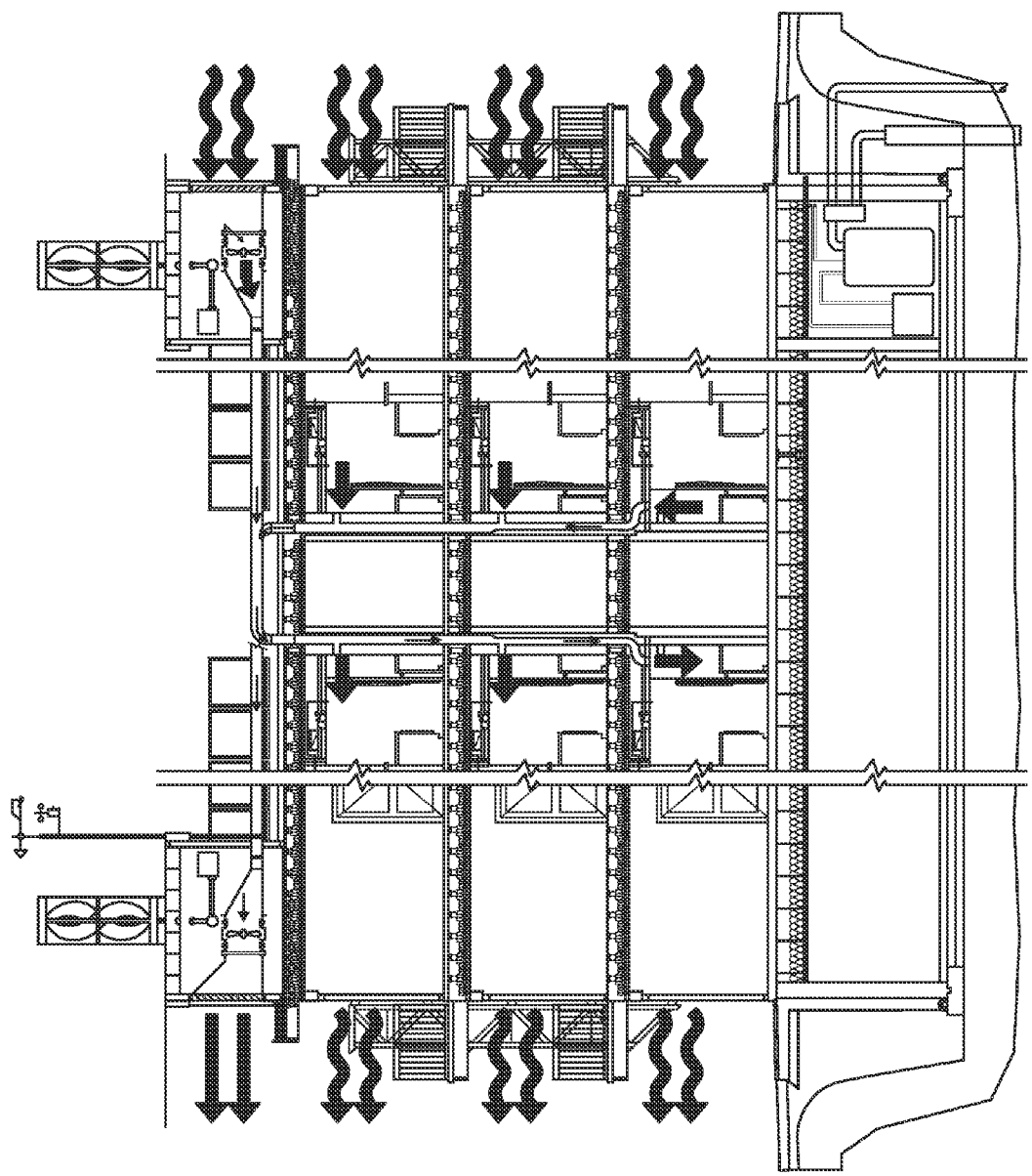
FIG. 15 is a schematic cross-section of a building design illustrating ventilation flows.

In accordance with further embodiments of the invention, otherwise expensive environmentally conscious designs can be made less costly by integrating environmental considerations into the collection of dwelling unit module designs. Design costs can thus be spread over many different buildings that can be designed and built using the pre-designed modules. One environmentally conscious design is illustrated with reference to FIG. 15. The top of a vertical stack or the top floor unit of a building may be provided with wind detection equipment. A weather vane and a wind speed monitor may be mounted on the roof of the building to supply wind related data. By designing into the exterior walls of the dwelling units remotely controlled exterior vents, a system can be installed that opens vents that are upwind for air intake and opening vents that are downwind for air exhaust. A mechanical fan assist may be included in the system to pull additional air through the building, if needed. The opening and closing of vents and the direction and speed of the fan assist can be controlled in response to wind direction, wind speed, interior and exterior humidity and interior and exterior temperature. Energy savings would be achieved by taking advantage of natural wind to ventilate the building thereby reducing reliance on electric powered fans and air conditioning. On hot humid days, the natural ventilation might be closed or reduced so as not to overload the building and the air conditioning with interior humidity. On cold days, the natural ventilation might be closed or reduced to avoid unnecessarily increasing heating costs.

In various embodiments, the herein disclosed methods including those for a user interface and for filling a building outline may be implemented as a computer program product for use with a computer system. Such implementations may include a series of computer instructions fixed either on a tangible medium, such as a computer readable medium (e.g., a diskette, CD-ROM, ROM, EPROM, EEPROM, or fixed disk) or transmittable to a computer system, via a modem or other interface device, such as a communications adapter connected to a network. The connection may be either a tangible connection (e.g., optical or analog communications lines) or a connection implemented with wireless techniques (e.g., microwave, infrared or other transmission techniques). The series of computer instructions may embody desired functionalities previously described herein with respect to the system. Those skilled in the art should appreciate that such computer instructions can be written in a number of programming languages for use with many computer architectures or operating systems.

Furthermore, such instructions may be stored in any memory device, such as semiconductor, magnetic, optical or other memory devices, and may be transmitted using any communications technology, such as optical, infrared, acoustic, radio, microwave, or other transmission technologies. It is expected that such a computer program product may be distributed as a removable medium with accompanying printed or electronic documentation (e.g., shrink wrapped software), preloaded with a computer system (e.g., on system ROM, EPROM, EEPROM, or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or substantially in software (e.g., a computer program product).

Of course, it should be understood that various changes and modifications to the preferred embodiments described above will be apparent to those skilled in the art. For example, different dwelling designs may be generated for use in a collection of module designs that meets the requirements of satisfying the grid and the ability to create a variety of multi-family building designs. Moreover, for different uniform grid intervals, different collections of dwelling unit modules may be created. Furthermore, the invention may be used to build most or a substantial portion of a multi-family or multi-use dwelling building, while additional units are designed specifically for a project or as additions to the collection. These and other changes can be made without departing from the spirit and the scope of the invention and without diminishing its attendant advantages. It is therefore intended that such changes and modifications be covered by the following claims.

What is claimed is:

1. A method of designing a multi-family dwelling building or the multi-family portion of a mixed-use building for a site of arbitrary dimensions, the method implemented in a computer system, the method comprising:
   storing a collection of dwelling unit module designs, each module design fitting onto uniform grid intervals defining a structural support system;
   wherein the collection of module designs includes designs for at least an end module and an interior module, each end module designed to fit at an end of a building to be designed and each interior module designed to fit between two of the modules, each module including at least one footprint for a bathroom and accommodating a corridor entrance to the dwelling unit module, wherein the entire collection of module designs permits a complete layout of the dwelling units for the multi-family dwelling building using modules from the collection;
   using a graphical interface to the computer system to access the stored collection of modules and to lay out a pattern of modules from the collection of modules so as to produce a design for the multi-family dwelling building, the design meeting requirements for all access, egress, and vertical circulation in the building; and
   storing the design.

2. The method of claim 1 further comprising defining an outline for the building that fits the site so as to satisfy any zoning regulations, building codes and setbacks and wherein laying out the pattern of modules comprises filling the outline with the pattern of modules.

3. The method of claim 1 wherein the collection of module designs further includes a design for an exit stairway interior module having a stairway and exit passage and a design for an interior module with a perimeter corresponding to that of the exit stairway interior module and wherein the graphical interface is used to locate the exit stairway interior module on a floor with access to outside ground and to locate the interior module with corresponding perimeter above the exit stairway interior module.

4. The method of claim 1 wherein:
   using the graphical interface further includes developing a site-specific parking layout fitting the uniform grid intervals; and wherein the pattern of modules are for arrangement atop the parking layout.

5. The method of claim 1 wherein the collection of dwelling unit module designs was created in advance of and independent of using the graphical interface for a specific project.

6. The method of claim 1 wherein the dwelling unit module designs are three dimensional.

7. The method of claim 6 wherein each dwelling unit module design comprises a vertical stack of dwelling units including at least a bottom floor unit and a top floor unit.

8. The method of claim 7 wherein each vertical stack is specified by working drawings and specifications.

9. The method of claim 6 wherein each module is completely dimensioned and wherein materials for each module are completely specified, so as to provide detail for each module to a level constituting construction documentation and wherein storing the collection of modules includes storing data for the modules in detail to the level of construction documentation, so that the design for the multi-family dwelling is at the level of construction documentation.

10. The method of claim 6 wherein each module contains exterior elements, and wherein storing the collection of modules includes storing data for exterior elements of the modules, so that the design for the multi-family dwelling includes exterior elements of the building.

11. A method of constructing a building in accordance with the design determined by the method of claim 1 wherein the grid intervals are less than 14 feet; said method of constructing comprising transporting a module corresponding to a section of one of the dwelling unit module designs over roads to the building site.

12. A computer program product comprising instructions stored in a computer readable non-transitory storage medium, such instructions, when loaded into a digital computer, establishing a system for designing a multi-family dwelling building for a site of arbitrary dimensions, the system comprising:
   data defining a collection of three-dimensional dwelling unit module designs, each module design fitting uniform grid intervals defining a structural support system, wherein the collection of module designs includes designs for at least an end module and an interior module, each end module designed to fit at an end of a building to be designed and each interior module designed to fit between two of the modules, each module including at least one footprint for a bathroom and accommodating a corridor entrance to the dwelling unit module, wherein the entire collection of module designs permits a complete layout of the dwelling units for the multi-family dwelling building using modules from the collection; and
   program code for creating a graphical interface that enables a user to define an outline for the building that fits the site so as to satisfy any zoning regulations, building codes and setbacks and to fill the outline with a pattern of modules from the collection, so as to produce a design for the multi-family dwelling building, the design meeting requirements for all access, egress, and vertical circulation in the building.

13. The computer program product of claim 12 wherein the program code for creating a graphical interface further enables a user to develop a site-specific parking layout that fits under the building.

14. The computer program product of claim 12 wherein each module design includes complete dimensions and completely specifies materials for each module so that the design for the multi-family dwelling is at the level of construction documentation.

15. The computer program product of claim 12 wherein each dwelling unit module design corresponds to a vertical stack of dwelling units specified by working drawings and specifications.

16. The computer program product of claim 12 wherein each dwelling unit module design comprises a vertical stack of dwelling units including at least a bottom floor unit and a top floor unit.

17. The method of claim 12 wherein each module contains exterior elements to be located on the exterior of the building.

18. A system for designing a multi-family dwelling building comprising:
a computer storage unit storing a collection of dwelling unit module designs, each module design fitting onto uniform grid intervals defining a structural support system, wherein the collection of module designs includes designs for at least an end module and an interior module, each end module designed to fit at an end of a building to be designed and each interior module designed to fit between two of the modules, each module including at least one footprint for a bathroom and accommodating a corridor entrance to the dwelling unit module, wherein the entire collection of module designs permits a complete layout of the dwelling units for the multi-family dwelling building using modules from the collection; and
a graphical user interface in communication with the computer storage unit, the graphical user interface being adapted to allow a user to access the stored collection of dwelling unit module designs through use of the graphical user interface to lay out a pattern of modules from the collection so as to produce a design for the multi-family dwelling building, the design meeting requirements for all access, egress, and vertical circulation in the building.

19. The system of claim 18 wherein the graphical user interface is further adapted to allow the user to define an outline for the building that fits a building site so as to satisfy any zoning regulations, building codes and setbacks such that laying out the pattern of modules comprises filling the outline with the pattern of modules.

20. The system of claim 18 wherein the collection of dwelling unit module designs was created in advance of and independent of using the graphical interface for a specific project.

21. The system of claim 18 wherein the dwelling unit module designs are three dimensional.

22. The system of claim 21 wherein each dwelling unit module design comprises a vertical stack of dwelling units including at least a bottom floor unit and a top floor unit.

23. The system of claim 22 wherein each vertical stack is specified by working drawings and specifications.

24. The system of claim 21 wherein each module is completely dimensioned and wherein materials for each module are completely specified, so as to provide detail for each module to a level constituting construction documentation so that the design for the multi-family dwelling building is at the level of construction documentation.

25. The system of claim 21 wherein each module design stored in the computer storage unit contains data for exterior elements of the module design, so that the design for the multi-family dwelling building includes exterior elements of the building.

* * * * *